(12) United States Patent
Cohen

(10) Patent No.: US 9,456,012 B2
(45) Date of Patent: *Sep. 27, 2016

(54) INLINE USER ADDRESSING IN CHAT AND DOCUMENT EDITING SESSIONS

(71) Applicant: GOOGLE INC., Mountain View, CA (US)

(72) Inventor: Gabriel Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,387

(22) Filed: Jan. 16, 2015

(65) Prior Publication Data

US 2015/0127603 A1    May 7, 2015

Related U.S. Application Data

(63) Continuation of application No. 13/166,751, filed on Jun. 22, 2011, now Pat. No. 8,938,669.

(60) Provisional application No. 61/453,072, filed on Mar. 15, 2011.

(51) Int. Cl.
  *G06F 17/24*  (2006.01)
  *G06F 17/30*  (2006.01)
  (Continued)

(52) U.S. Cl.
  CPC .......... *H04L 65/403* (2013.01); *G06F 17/24* (2013.01); *G06F 17/30011* (2013.01); *G06Q 10/101* (2013.01); *H04L 51/046* (2013.01); *H04L 63/101* (2013.01)

(58) Field of Classification Search
  CPC  G06F 17/24; H04L 12/1813; H04L 12/1822
  See application file for complete search history.

(56) References Cited

U.S. PATENT DOCUMENTS 6,081,830 A * 6/2000 Schindler ............... H04L 29/06
                                                      348/552
6,594,693 B1 * 7/2003 Borwankar .......... H04L 12/1827
                                                      709/203

(Continued)

OTHER PUBLICATIONS

How @replies work on Twitter, blog.twitter.com/2008/how-replies-work-twltter-and-ho-they-might, May 12, 2008, pp. 1-4 https://blog.twitter.com/2008/how-replies-work-twitter-and-how-they-might.*

(Continued)

*Primary Examiner* — Scott Baderman
*Assistant Examiner* — Mario M Velez-Lopez
(74) *Attorney, Agent, or Firm* — Morgan, Lewis & Bockius LLP

(57) ABSTRACT

A computer-implemented method is executed on a server having one or more processors and memory storing one or more programs to be executed by the one or more processors. The method includes receiving document editing commands, for editing a respective document, from one or more users in a document editing session, and editing the respective document in accordance with the commands received from the users. The received commands including document text for the document. The method further includes detecting, within the respective document text, an embedded request to invite a specified user to access the respective document, and responding by sending an invitation to the specified user, and, if needed, adding the specified user to an access control list of the respective document to enable the specified user to access the document in response to detecting the embedded request.

19 Claims, 19 Drawing Sheets

(51) Int. Cl.
*H04L 29/06* (2006.01)
*H04L 12/58* (2006.01)
*G06Q 10/10* (2012.01)

(56) References Cited

U.S. PATENT DOCUMENTS

| | | | | |
|---|---|---|---|---|
| 7,249,157 | B2* | 7/2007 | Stewart | G06Q 10/06 705/37 |
| 7,383,308 | B1* | 6/2008 | Groves | G06Q 10/109 709/205 |
| 7,418,663 | B2* | 8/2008 | Pettinati | G06Q 10/10 707/999.006 |
| 7,707,249 | B2* | 4/2010 | Spataro | H04L 65/403 709/205 |
| 7,882,194 | B2 | 2/2011 | Lingafelt et al. | |
| 8,060,820 | B2* | 11/2011 | Bedi | G06Q 10/107 715/255 |
| 8,202,166 | B2* | 6/2012 | Green | G07F 17/32 463/31 |
| 8,443,048 | B2* | 5/2013 | Lingafelt | G06Q 10/10 370/352 |
| 8,484,292 | B2 | 7/2013 | Spataro et al. | |
| 8,752,138 | B1* | 6/2014 | Bennett | H04L 65/403 348/211.12 |
| 2002/0065848 | A1* | 5/2002 | Walker | G06F 17/24 715/205 |
| 2003/0005151 | A1 | 1/2003 | Ullman et al. | |
| 2004/0111479 | A1* | 6/2004 | Borden | G06Q 10/107 709/206 |
| 2004/0174392 | A1* | 9/2004 | Bjoernsen | G06Q 10/10 715/751 |
| 2004/0210844 | A1 | 10/2004 | Pettinati et al. | |
| 2005/0010874 | A1* | 1/2005 | Moder | G11B 27/02 715/751 |
| 2005/0021624 | A1* | 1/2005 | Herf | H04L 12/1822 709/204 |
| 2005/0114475 | A1* | 5/2005 | Chang | G06Q 10/10 709/220 |
| 2007/0168446 | A1* | 7/2007 | Keohane | G06Q 10/107 709/207 |
| 2007/0198474 | A1* | 8/2007 | Davidson | G06F 17/30985 |
| 2007/0198647 | A1* | 8/2007 | Lingafelt | H04L 12/1822 709/207 |
| 2007/0288575 | A1* | 12/2007 | Gillum | G06Q 10/107 709/206 |
| 2008/0080679 | A1* | 4/2008 | Fernandez | G06Q 10/107 379/88.17 |
| 2009/0006936 | A1* | 1/2009 | Parker | H04L 12/1813 715/200 |
| 2009/0063943 | A1* | 3/2009 | Balasubramanian | G06F 17/2229 715/200 |
| 2009/0158163 | A1* | 6/2009 | Stephens | G06F 17/30864 715/738 |
| 2010/0037277 | A1* | 2/2010 | Flynn-Ripley | H04L 29/12896 725/110 |
| 2010/0114965 | A1 | 5/2010 | Dean et al. | |
| 2010/0235894 | A1 | 9/2010 | Allen, Jr. et al. | |
| 2011/0141974 | A1* | 6/2011 | Lieberman | H04L 12/5895 370/328 |
| 2012/0102420 | A1* | 4/2012 | Fukahori | G06Q 10/107 715/771 |
| 2013/0007147 | A1* | 1/2013 | Toga | G06Q 10/107 709/206 |

OTHER PUBLICATIONS

Google Inc., Notification of First Office Action, CN 201280013577.5, Jun. 1, 2015, 10 pgs.
Google Inc., International Search Report / Written Opinion, PCT/US2012/027851, Jul. 27, 2012, 9 pgs.
Google Inc., Supplementary European Search Report, EP 12708633.8, Jan. 7, 2015, 7 pgs.
How @replies work on Twitter, blog.twitter.com/2008/how-replies-work-twitter-and-how-they-might, May 12, 2008, pp. 1-4.
Google Inc., Office Action, CA 2828011, Feb. 11, 2015, 8 pgs.

* cited by examiner

Documents stored in Chat/
Doc Database
120

402

| Document 1 |
| 402-1 |
| Document 2 |
| 402-2 |
| ⋮ |
| Document N |
| 402-P |

| Meta Data 404 |
| Document ID 406 |
| Access Control List 408 |
| Document Type 410 |
| Associated Chat ID(s) 412 |
| ⋮ |
| Document Content 414 |

FIGURE 4A

Chats stored in Chat/Doc
Database
120

422

| Chat 1 |
| 422-1 |
| Chat 2 |
| 422-2 |
| ⋮ |
| Chat N |
| 422-P |

| Chat ID 424 |
| Access Control List 426 |
| Associated Document ID(s) 428 |
| ⋮ |
| Chat Content 430 |

FIGURE 4B

INLINE USER ADDRESSING IN CHAT AND DOCUMENT EDITING SESSIONS

RELATED APPLICATIONS

This application is a continuation of U.S. patent application Ser. No. 13/166,751, filed Jun. 22, 2011, entitled "Inline User Addressing In Chat And Document Editing Sessions," now U.S. Pat. No. 8,938,669, which claims priority to U.S. Provisional Patent Application No. 61/453,072, filed Mar. 15, 2011, entitled "Inline User Addressing in Chat and Document Editing Sessions," which is hereby incorporated by reference in its entirety.

This application is related to U.S. patent application Ser. No. 13/166,748, filed Jun. 22, 2011, entitled "Inline User Addressing in Chat Sessions," which is hereby incorporated by reference in its entirety.

TECHNICAL FIELD

The present invention relates generally to communications within computer network systems, and in particular, to a method and system for inviting users to chat sessions and document editing sessions.

BACKGROUND

On-line collaboration tools permit users to collaborate on projects, share information, meet and discuss issues, and make content, all on-line. Tools such as online document editing applications and online chat applications are popular amongst Internet users.

It takes several steps to guide a new user into the conversational flow of a chat session. For example, one or more users of the chat session must navigate menu options to invite the new user, and may need to repeat or summarize relevant portions of the chat conversation that the new user needs to know.

Similarly, it takes several steps to invite a new user to a document editing session. For example, one or more users of the document editing session must navigate menu options to invite the new user, assign access rights to the new user, explain to the new user why their presence is requested, and then direct the new user to a portion of the document that requires the new user's attention.

Accordingly, it would be desirable to provide a system and method to more easily invite a user into a chat session or document editing session.

SUMMARY

According to some embodiments, a method of managing cooperative document editing is performed at a server having one or more processors and memory storing one or more programs to be executed by the one or more processors so as to perform the method is disclosed. The method includes receiving document editing commands, for editing a respective document, from one or more users in a document editing session. The one or more users are authorized to edit the respective document. The method also includes editing the respective document in accordance with the commands received from the users. The received commands including document text for the document. The method further includes detecting, within the respective document text, an embedded request to invite a specified user to access the respective document. The method further includes responding to detecting the embedded request by sending an invitation to the specified user, and, if needed, adding the specified user to an access control list of the respective document to enable the specified user to access the document in response to detecting the embedded request.

In some embodiments, the document is selected from the group consisting of a word processing document, a spreadsheet document, a presentation document, a drawing, and a webpage.

In some embodiments, the embedded request includes a predefined symbol followed by a user identifier of the specified user. In some embodiments, the detecting includes detecting a predefined symbol in the document text content followed by one or more characters entered after the predefined symbol, identifying one or more contact suggestions based on the one or more characters entered after the predefined symbol, and sending the one or more contact suggestions to the client. The contact suggestions are from an address book of the respective participant. In some embodiments, the method repeats the operations of identifying of one or more contact suggestions and sending contact suggestions upon receiving each successive character of the one or more characters following the predefined symbol.

In some embodiments, the invitation includes a link to the document being edited. Optionally, the link includes a command or position parameter specifying a portion of the document to be initially displayed or presented by the specified user's client when the link is selected or activated by the specified user.

In some embodiments, sending the invitation to the specified user includes, when the specified user is online, sending the invitation through an online channel corresponding to one of: an active window of an application corresponding to a chat session, an active window of an application corresponding to the document editing session, an inactive window of the application corresponding to the document editing session, and an online application other than the application corresponding to the document editing session.

In some embodiments, the method further includes receiving chat content from one or more of the users authorized to access the document for a chat conversation associated with the document, adding the embedded request to the chat conversation, and sending at least a portion of the chat conversation that includes the embedded request to one or more of the users authorized to access the document. In some embodiments, the method includes adding to the chat conversation a link to a portion of the document corresponding to the embedded request.

According to some embodiments, a computer readable storage medium storing one or more programs configured for execution by one or more processors of a server system, the one or more programs comprising instructions to be executed by the one or more processors so as to perform any of the methods described herein.

According to some embodiments, a server system, including one or more processors and memory storing one or more programs for execution by the one or more processors so as to perform any of the method described herein.

BRIEF DESCRIPTION OF THE DRAWINGS

FIGS. 4A and 4B illustrate exemplary data structures according to some embodiments.

Like reference numerals refer to corresponding parts throughout the drawings.

DESCRIPTION OF EMBODIMENTS

Figure 1:
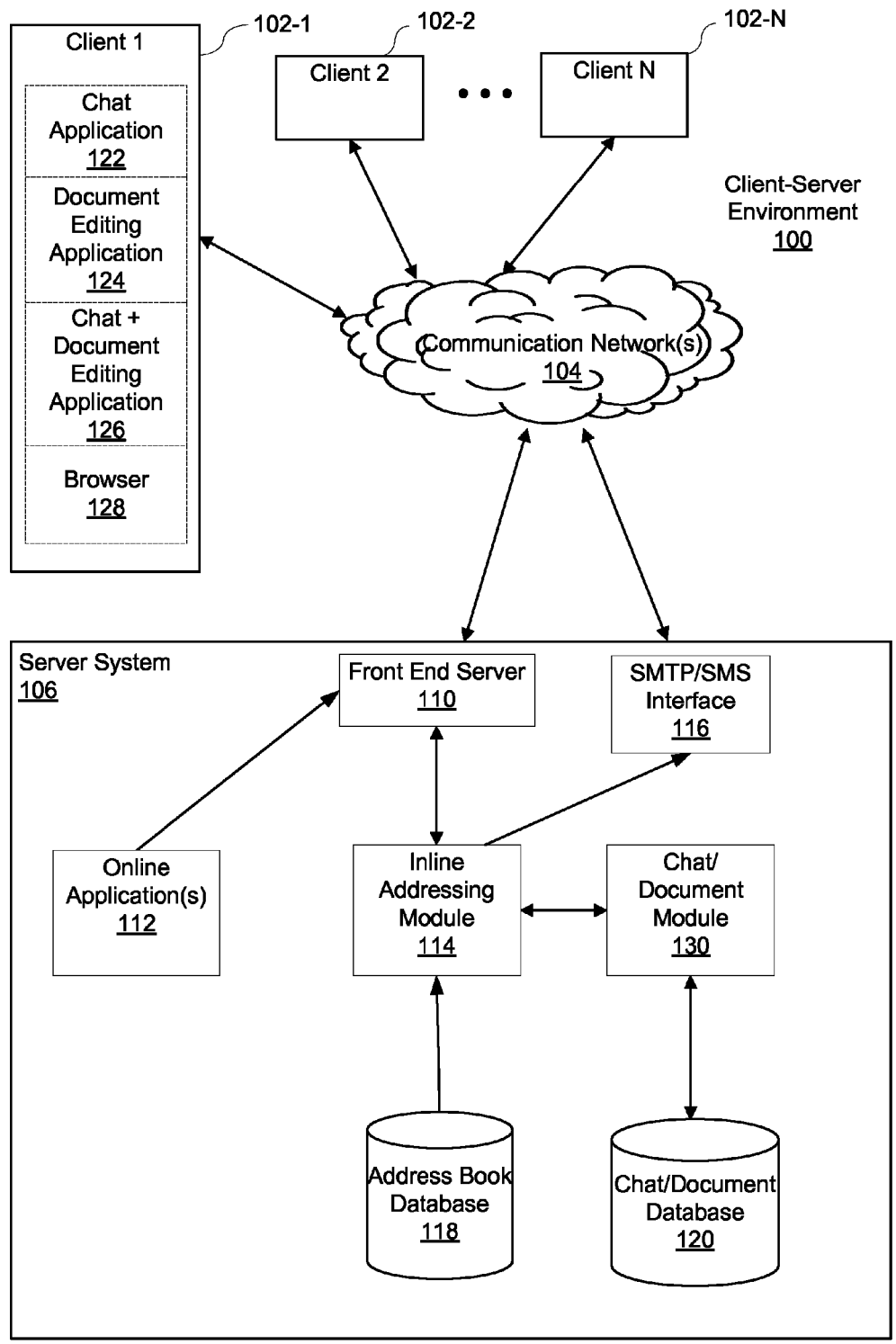
FIG. 1 is a block diagram illustrating a distributed client-server system in accordance with some embodiments.

Methods and systems for inline user addressing in chat and document editing sessions are described. Reference will be made to certain embodiments, examples of which are illustrated in the accompanying drawings. While specific embodiments will be described, it will be understood that this is not intended to limit the claims to these particular embodiments alone. On the contrary, the claims are intended to cover alternatives, modifications and equivalents of the disclosed embodiments.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding. However, the invention may be practiced without these specific details. In other instances, well-known methods, procedures, components, and circuits have not been described in detail so as not to unnecessarily obscure aspects of the embodiments.

As used herein, instant messaging (IM) is real-time communication between two users using devices executing software applications that establish an IM session between the two users. As used herein, chat is real-time communication between two or more users using devices executing software applications that establish a connection with a device hosting a chat session or chat room for the two or more users. To communicate via IM or chat, the participants maintain a persistent connection to the IM session or the chat session. Stated in another way, to communicate via IM or chat, the participants' devices and chat applications maintain a persistent connection with the device hosting a software that establishes chat sessions and/or IM sessions. The communications are in real-time because the communications are exchanged instantly or with negligible latency. In some embodiments, the communications between the two or more users may include text, voice, video and images. In some embodiments, the IM sessions or chat sessions are hosted by a server and the respective participants' connect to the server to enter into the respective IM/chat session. Furthermore, chat messages or instant messages may be conveyed between the users through a network such as the one described in greater detail herein.

FIG. 1 is a block diagram illustrating a distributed system 100 that includes two or more client devices 102, a communication network 104 and a server system 106. The server system 106 is coupled to the one or more client devices 102 by the communication network 104.

In some embodiments server system 106 is be implemented as a single server, while in other embodiments it is implemented as a distributed system of multiple servers. Solely for convenience of explanation, server system 106 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the client devices 102 and server system 106. In some embodiments, the communication network 104 uses the HyperText Transport Protocol (HTTP) and the Transmission Control Protocol/Internet Protocol (TCP/IP) to transmit information between devices or systems. HTTP permits client devices 102 to access various resources available via the communication network 104. The various embodiments of the invention, however, are not limited to the use of any particular protocol.

In some embodiments, server system 106 includes a front end server 110 that facilitates communication between server system 106 and clients 102. In some embodiments, front end server 110 is configured to receive and/or send chat content, document editing commands, documents, document content, chats, contact information, applications, invitations to chat sessions, invitations to document editing sessions and invitations to "chat+document" editing sessions. As used herein, a "chat+document" session or chat/document session is a chat session that is associated with a document editing session or vice versa.

In some embodiments, server system 106 includes an SMTP/SMS interface 116, which facilitates the transfer of email messages and SMS messages between server system 106 and the network 104. SMTP/SMS interface 116 sends invitations (e.g., chat invitations, document editing invitations or chat+document editing invitations) generated by an inline addressing module 114 to respective client devices 102 via network 104. In some embodiments, SMTP/SMS interface 116 also receives invitations to chats, invitations to document editing sessions and invitations to chat+document sessions sent by respective client device 102, via network 104.

In some embodiments, server system 106 includes a chat/document database 120 that stores chat content and/or collaborative documents. In some embodiments, the chat/document database 120 also stores SMS messages and email messages. Chat content and collaborative documents are described in greater detail herein. In some embodiments, the chat/document database 120 is a distributed database, distributed over multiple servers within server system 106.

In some embodiments, server system 106 includes an address book database 118 that stores address books (also called contact lists or contact databases) for users of server system 106. In some embodiments, address book database 118 is a distributed database, distributed over multiple servers within server system 106. Address books are described in greater detail herein.

In some embodiments, server system 106 includes online applications 112, including applications that are executed on server system 106 or that are sent to client devices 102 for execution. In some embodiments, one or more of online applications 112 are sent to a respective client 102 in response to a client request. Online applications 112 store and access information in address book database 118 and chat/document database 120. Online applications 112 are discussed in greater detail herein.

In some embodiments, server system 106 includes an inline addressing module 114 that assists in accessing, updating and modifying data in address book database 118 and chat/document database 120. In some embodiments, inline addressing module 114 uses information from chat/document database 120, address book database 118 and/or chat/document content received from front end server 110 to generate contact suggestions, invitations to document editing sessions, invitations to chat sessions, and invitations to chat+document editing sessions. Inline addressing module 114 is discussed in greater detail herein.

In some embodiments, server system 106 includes a chat/document module 130 that creates and maintains chat sessions, document editing sessions and chat+document editing sessions. In some embodiments, chat/document module 130 stores and retrieves information stored in chat/document database 120. Chat/document module 130 is discussed in greater detail herein.

In some embodiments, a user interfaces with server system 106 at a client device 102. Client devices 102 may be any suitable computer devices that are capable of connecting to server system 106 via communication network 104, such as computers, desktop computers, laptop computers, tablet devices, netbooks, internet kiosks, personal digital assistants, mobile phones, gaming devices, or any other device that is capable of communicating with server system 106. Client devices 102 typically include one or more processors, non-volatile memory, such as flash memory or a hard disk drive, and a display. The client devices 102 may also have input devices such as a keyboard and a mouse (as shown in FIG. 2).

In some embodiments, a respective client device 102 includes a chat application 122 that allows a respective user to chat with other users of other client devices 102. Optionally, the respective client device 102 includes a document editing application 122 that allows a respective user to edit documents stored on the client device 102 or on server system 106. In some embodiments, the respective client device 102 includes a chat+document editing application 122 for concurrently chatting and editing documents. Chat application 112, document editing application 124 and chat+document editing application are discussed in greater detail herein.

In some embodiments, the respective client device 102 includes a browser application 128 for requesting, parsing, displaying, executing webpages and executing applications included in webpages. The browser application 128 can be any application that permits a user to search for, browse, and/or use resources (e.g., web pages and web services) identified by a URL (uniform resource locator) or URI (uniform resource identifier). The term "URL" is used herein to mean a network address or location of a document. In this context, the term "document" means any document or content of any format including, but not limited to, word processing documents, spreadsheet documents, presentation documents, drawings, webpages, text, image, audio, video, etc., that may be used by a web browser or other applications.

Figure 2:
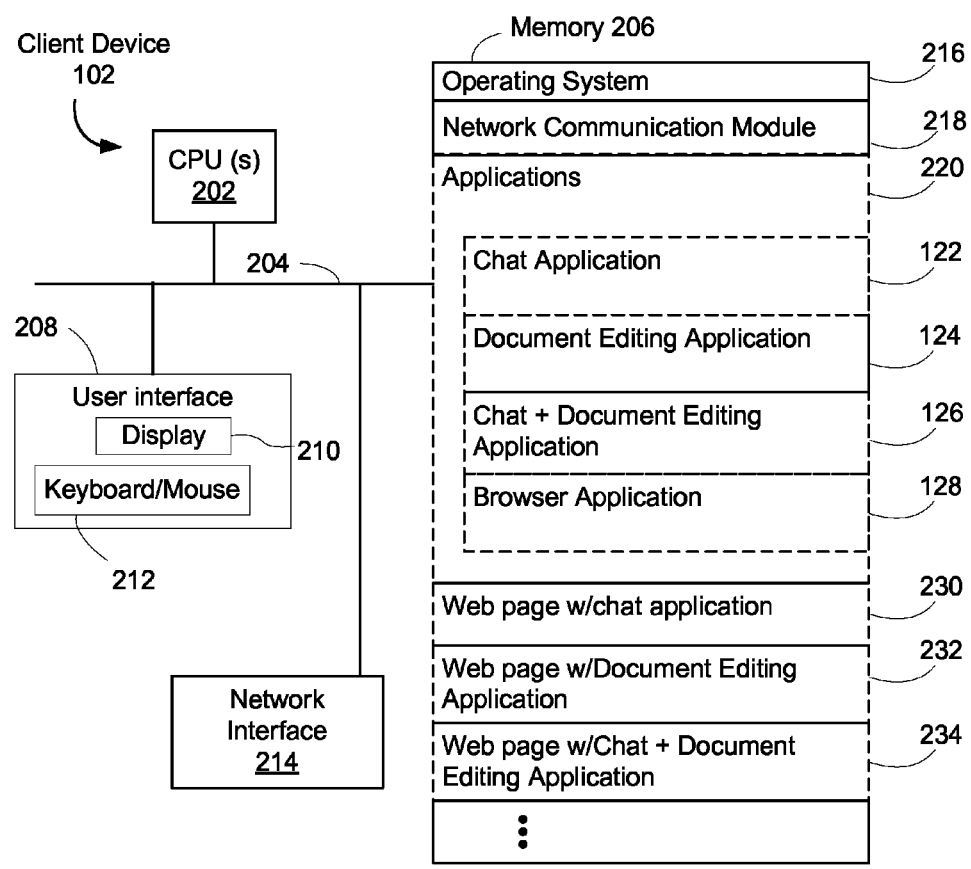
FIG. 2 is a block diagram of a client device according to some embodiments.

FIG. 2 is a block diagram illustrating a client device 102, in accordance with some embodiments. client device 102 includes one or more processing units (CPU's) 202, one or more network or other communications interfaces 214, memory 206, and one or more communication buses 204 for interconnecting these components. The communication buses 204 optionally include circuitry (sometimes called a chipset) that interconnects and controls communications between system components. Client device 102 typically includes a user interface, comprising for example a display device 210 and optionally a keyboard and/or mouse (or other pointing device) 212. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within memory 206, comprises a computer readable storage medium. In some embodiments, memory 206 or the computer readable storage medium of memory 206 store the following programs, modules and data structures, or a subset thereof:

an operating system 216 that includes procedures for handling various basic system services and for performing hardware dependent tasks;

a network communication module 218 that is used for connecting client device 102 to server system 106 and/or other devices and computers via the one or more communication network interfaces 214 (wired or wireless) and one or more communication networks, such as the Internet, other wide area networks, local area networks, metropolitan area networks, and so on;

optionally, one or more applications 220 that are executed by the one or more processors 202 of the client device; applications 220 typically include one or more of: a chat application 122, a document editing application 124, a chat+document editing application 126 and/or a browser application 128; and optionally, one or more web pages, such as a web page with an embedded chat application 230, a web page with an embedded document editing application 232, and/or a web page with an embedded chat+document editing application 234.

Chat application 122, if included in client device 102, enables a user of client device 102 to engage in real-time communications in a chat session with users at one or more other client devices. In some embodiments, chat application 122 connects to a server (e.g., server system 106) in order to create or join a chat session.

Document editing application 124, if included in client device 102, enables a user of client device 102 to edit documents located on the client device 102 or on server system 106 (e.g., in the chat/document database 118) remotely located from the client device 102. In some embodiments, document editing application 124 works in conjunction with an online document editing service (e.g., chat/document module 130 of server system 102) that enables multiple users to concurrently edit a document. In some embodiments, document editing application 124 connects to a server (e.g., server system 106) in order to create or join a document editing session.

The chat+document editing application 126, if included in client device 102, enables a user of client device 102 to edit a document and to have chat communications with users of other client devices who are jointly editing the document with the user of client device 102. Stated in another way, chat+document editing application 126 enables a user of client device 102 to participate in a document editing session, associated with a chat session, concurrently with users of other client devices. The document edited using chat+document editing application 126 may be located on client device 102 or on server system 106 (e.g., in the chat/document database 120). In some embodiments, chat+document editing application 126 works in conjunction with an online document editing service (e.g., chat/document module 130 of server system 102) that enables multiple users to concurrently edit a document and to also concurrently conduct a chat session. In some embodiments, the chat+document editing application 126 connects to a server (e.g., server system 106) in order to create or join a chat+document editing session.

Browser application 128 (e.g., Google's Chrome, Mozilla's Firefox, Apple's Safari, or Microsoft's Internet Explorer) can be any application that permits a user to browse and access resources (e.g., web pages and web services) identified by a URL or URI.

Web pages with applications 230, 232 and 234 perform similar operations to those described with respect to applications 122, 124 and 126 respectively. In some embodiments, web pages with applications 230, 232 and 234 are received from a server (e.g., server system 106) remotely located from the client device 102 and executed by one or more processors 202 of client device 102. The applications embedded in web pages 230, 232 and 234 may be written in JavaScript™ (a trademark of Sun Microsystems, Inc.), ECMAScript (the specification for which is published by the European Computer Manufacturers Association International), VBScript™ (a trademark of Microsoft, Inc.), C/C++, Java device 102 and/or any other programming/scripting language. In some embodiments, the applications embedded in web pages 230, 232 and 234 are partially executed on client device 102 and partially on a server (e.g., server system 106) remotely located from client device 102.

In some embodiments, a respective application (e.g., application 122, 124, 126 or 128) or a respective application embedded in a webpage includes instructions to determine whether the respective application is active or inactive. In some implementations, an application is active if a window corresponding to the application is currently selected and at least partially in view on the display 210 of client device 102. Typically, an application is inactive if the window corresponding to another application is active.

Each of the above identified elements, when included in a respective embodiment of client device 102, is stored in one or more of the previously mentioned memory devices, and each of the modules or programs corresponds to a set of instructions for performing a function described above when executed by one or more processors (e.g., the CPUs 202) of client device 102. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

FIG. 2 is intended more as functional description of respective embodiments of a client device than as a structural schematic of the embodiments described herein. In practice, and as recognized by those of ordinary skill in the art, items shown separately could be combined and some items could be separated into multiple parts or organized different than shown in FIG. 2.

Figure 3:
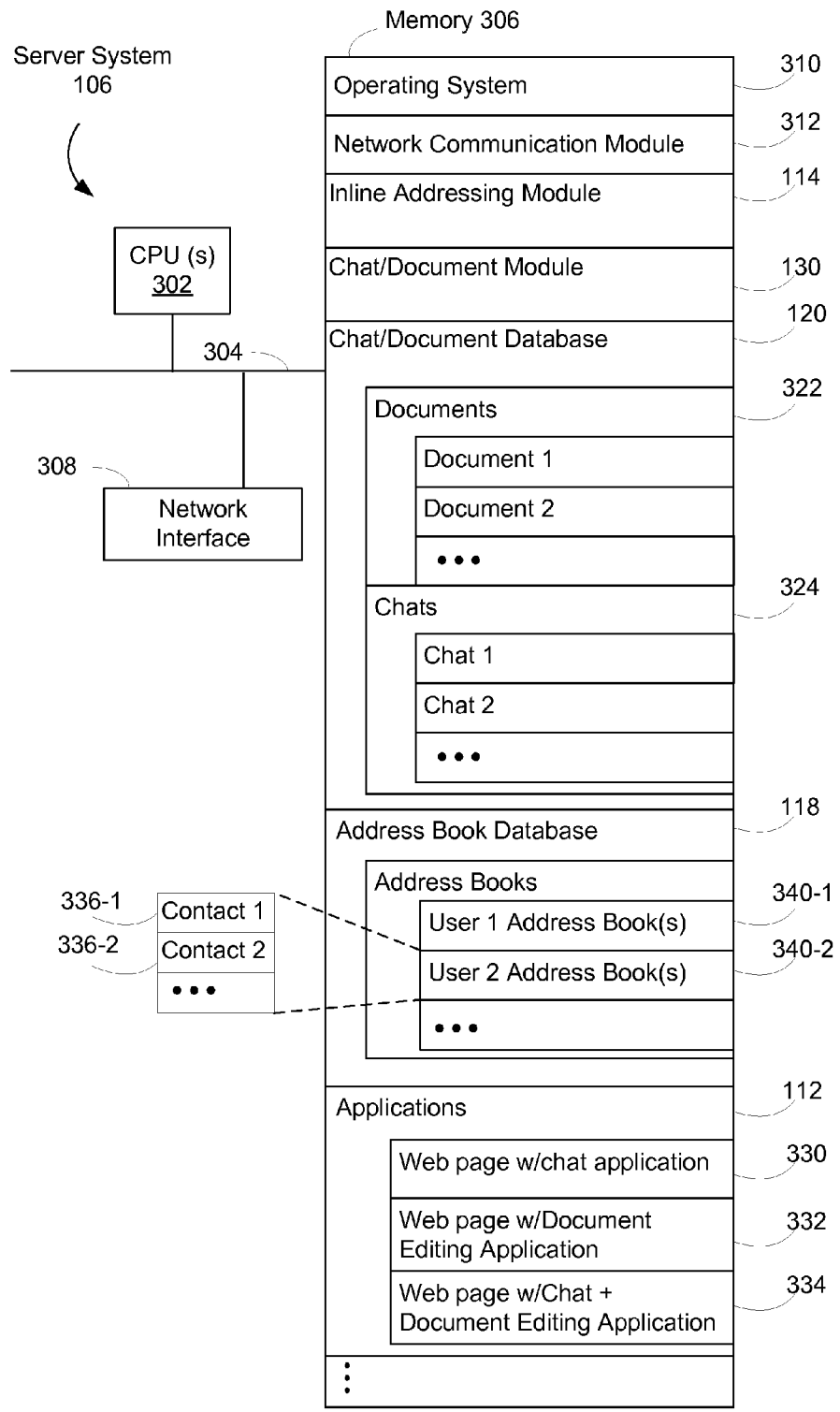
FIG. 3 is a block diagram of an exemplary server system according to some embodiments.

FIG. 3 is a block diagram illustrating server system 106, in accordance with some embodiments. Server system 106 includes one or more processing units (CPU's) 302, one or more network or other communications interfaces 308, memory 306, and one or more communication buses 304 for interconnecting these components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within memory 306, comprises a non-transitory computer readable storage medium. In some embodiments, memory 306 or the computer readable storage medium of memory 306 store the following programs, modules and data structures, or a subset thereof:

an operating system 310 that includes procedures for handling various basic system services and for performing hardware dependent tasks;

a network communication module 312 that is used for connecting server system 106 to client devices 102 and/or other devices and computers via the one or more communication network interfaces 308 (wired or wireless) and one or more communication networks, such as the Internet, other wide area networks, local area networks, metropolitan area networks, and so on;
an inline addressing module 114, discussed below;
chat/document module 130, which stores documents 322 and chats 324, as discussed in greater detail herein;
a chat/document database 120 stores documents 322 and chats 324; documents 322 and chats 324 are discussed in greater detail herein;
address book database 118, which includes address books 340 for users of server system 106. A respective address book 340 includes one or more contacts 336. The contacts 336 include contact information, such as name, address, email address, phone number, nicknames and chat screen names.
applications 112, which include one or more of: a web page with a chat application 330, a web page with a document editing application 332 and a web page with a chat+document editing application 334.

In some embodiments, a respective web page 330, 332 or 334 with an embedded application is sent to a client device 102 in response to a client request for the corresponding application, or a request for corresponding document. Web pages 330, 332 and 334 stored on server system 106, correspond to web pages 230, 232 and 234 stored at client device 102. In some embodiments, the application embedded in a respective web page 330, 332 or 334 is executed by the client device 102 to which the web page is sent. In some embodiments, the application embedded in a respective web page 330, 332, 334, while executed at the client device 102 to which the web page is sent (e.g., in response to an http request), works in conjunction with an online document editing service (e.g., chat/document module 130) provided by server system 106. As noted above, these applications enables multiple users to concurrently edit a document, to conduct a chat session, or both.

As discussed in more detail below, inline addressing module 114 detects embedded requests, generates contact suggestions, generates invitations, determines how invitations are sent to a user, and modifies access control lists for chats 324 and documents 322 stored in the chat/document database 118.

In some implementations, inline addressing module 114 detects embedded requests in chat content and document content stored in the chat/document database 118. In some embodiments, inline addressing module 114 detects embedded requests in chat content and document content as it is received by server system 106. As discussed in greater detail herein, a embedded request is a invitation entered into a chat session or document to invite a specified user to a chat session, document editing session or chat+document editing session.

In some implementations, inline addressing module 114 uses contact information stored in the address book database 118, as well as chat/document content received by server system 106 or stored in the chat/document database 120, to generate contact suggestions. In some embodiments, the contact suggestions are generated in response to detecting a partial embedded request in the chat content or the document content as the content is received by server system 106.

In some implementations, inline addressing module 114 uses chat content and document content received by server system 106 or stored in the chat/document database 118 to generate invitations to chat sessions, invitations to document editing session and invitations to chat+document editing session. In some embodiments, invitations are generated in response to detecting an embedded request in the chat content or the document content.

In some implementations, inline addressing module 114 modifies the access rights of a chat 324 or document 322 stored in the chat/document database 120 to allow a respective user to access the respective chat and/or document. In some embodiments, the access rights assigned to a user with respect to a chat 324 or document 322 are determined by server system 106 in accordance with information contained in an embedded request. Access rights for chats and documents are discussed in greater detail herein.

In some implementations, inline addressing module 114 determines how to send an invitation to a user. As discussed in greater detail herein, in various embodiments, inline addressing module 114 sends the invitation through an active window of an application, an inactive window of an application or through email/SMS.

The operations performed by inline addressing module 114 are further discussed herein.

In some embodiments, chat/document module 130 assists in generating and maintaining chat sessions, document editing sessions and chat+document editing sessions. The chat/document module 130 establishes chat sessions (or chat rooms) for two or more users, receives and transfers messages between the users and stores the chat content of the chat session into the chat/document database 120. The chat/document module 130 establishes document editing sessions, creates documents, modifies documents, transfers at least portions of documents to users of the document editing session and stores documents in the chat/document database 120. In some embodiments, the chat/document module 130 modifies information stored in the chat/document 120 to associate a document 322 with a chat 324.

Each of the above identified elements may be stored in one or more of the previously mentioned memory devices of server system 106, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above.

Although FIG. 3 shows a server system, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items (e.g., operating system 310 and network communication module 312) shown separately in FIG. 3 could be implemented on single servers and single items could be implemented by one or more servers. The actual number of servers used to implement server system 106 and how features are allocated among them will vary from one implementation to another, and may depend in part on the amount of data traffic that the system must handle during peak usage periods as well as during average usage periods.

FIGS. 4A and 4B illustrate data structures stored in chat/document database 120, in accordance with some embodiments. The data structures shown in FIG. 4A store collaborative documents that can be edited by users of the client devices 102, in accordance with some embodiments. The data structures shown in FIG. 4B store chat content corresponding to a chat session between two or more users of the client devices 102, in accordance with some embodiments. In some implementations, information stored in these data structures is used to generate invitations to chat sessions, document editing sessions and chat+document editing sessions.

FIG. 4A illustrates document data structures 402 stored in chat/document database 120 for storing documents, according to some embodiments. A respective document 402-2 includes meta data 404 and document content 414. Meta data 404 for a respective document 402 includes, in some embodiments, a document identifier (document ID) 406, an access control list 408, a document type 410 and optionally, additional information. In some embodiments, document ID 406 uniquely identifies a respective document 402. In other embodiments, document ID 406 uniquely identifies a respective document 402 in a directory (e.g., a file director) or other collection of documents within database 120. Document type 410 identifies the type of the document 402-2. In a non-limiting example, document type 410 for a respective document 402 in database 120 indicates that the respective document 402 is a word processing document, a spreadsheet document, a presentation document, a drawing or a webpage.

At least a plurality of the documents 402 in chat/document database 120 are collaborative documents that have been edited by multiple users, or have access rights that enable editing by multiple users. In some implementations a respective document 402 in database 120 is a document of one of a predefined set of document types, such as word processing documents, spreadsheet documents, presentation documents, drawings and web pages. In other implementations, the set of document types includes other documents types (e.g., C++ programs) and optionally excludes some of the aforementioned document types (e.g., web pages). Document content 414 for any particular document 402 is consistent with the document type 410 of that document.

Access control list 408 includes a list of users and their respective access rights for a respective document 402-2. A user's access rights with respect to a document 402 determine what actions the user can take with respect to the document 402. Document access rights include read only access, read/write access and share rights. A user with read only access to a document 402 can view the document 402 but cannot make any modifications to the document 402. A user with read/write access to a document 402 can both view and edit the document 402. Share rights determine whether a user can invite another user to access the document 402 and what access rights can be assigned to the invited user. In a non-limiting example, a user with share rights may invite another user to a document and assign read only access rights to that user. A user who is not listed in access control list 408 for a respective document 402 cannot access the document 402. In some embodiments, users are added to access control list 408 by inline addressing module 114 or chat/document module 130.

In some embodiments, meta data 404 includes associated chat ID(s) 412 for one or more chats 422 that are associated with the respective document 402-2. For example, the document 402-2 may have been at least partially edited in a chat+document editing session.

Attention is now directed to FIG. 4B which illustrates chat data structures 422, sometimes herein called chat records 422, stored in the Chat/Doc database 120 for storing information associated with chat/IM sessions, according to some embodiments. Each chat record 422 stores information associated with a chat session or IM session between two or more users. Each chat record 422 includes a chat ID 424, an access control list 426 and chat content 430. The chat ID 424 of a respective chat record 422 uniquely identifies a chat session. Chat content 430 includes the communications/chat history (e.g., text, voice, video and images) between the participants in the chat corresponding to chat record 422. A respective chat record 422 stores information for an active or inactive chat session. In some embodiments, an inactive chat session is one where the chat session has been terminated or that has timed out (e.g., no communications for 30 minutes). In some embodiments, an active chat session is a chat session that has not been terminated or that has not timed out. An inactive chat session may become an active chat session and vice versa.

The access control list 426 includes a list of users and their access rights with respect to a chat record 422. If the chat record 422 corresponds to an inactive chat session, a respective user's access rights determine whether the respective user can access the chat content 430 which includes the chat history of a chat session. If chat record 422 corresponds to an active chat session, a respective user's access rights determine whether the respective user can join and participate in the chat session. Typically, a user who is not on the access control list 426 for respective active chat cannot join the corresponding chat session. Similarly, a user who is not on the access control list 426 for a respective inactive chat typically cannot access the corresponding chat content 430 in the chat record 422 for that inactive chat. In both situations, a user gains access to the chat session or chat history when and if the user is added to the corresponding access control list 426. In some embodiments, users are added to the access control list 408 and assigned access rights by inline addressing module 114 or chat/document module 130.

In some embodiments, a respective chat record 422-2 includes one or more associated document IDs 428 for one or more documents that are associated with chat record 422-2. For example, chat record 422-2 may correspond to a chat+document editing session.

Figure 5:
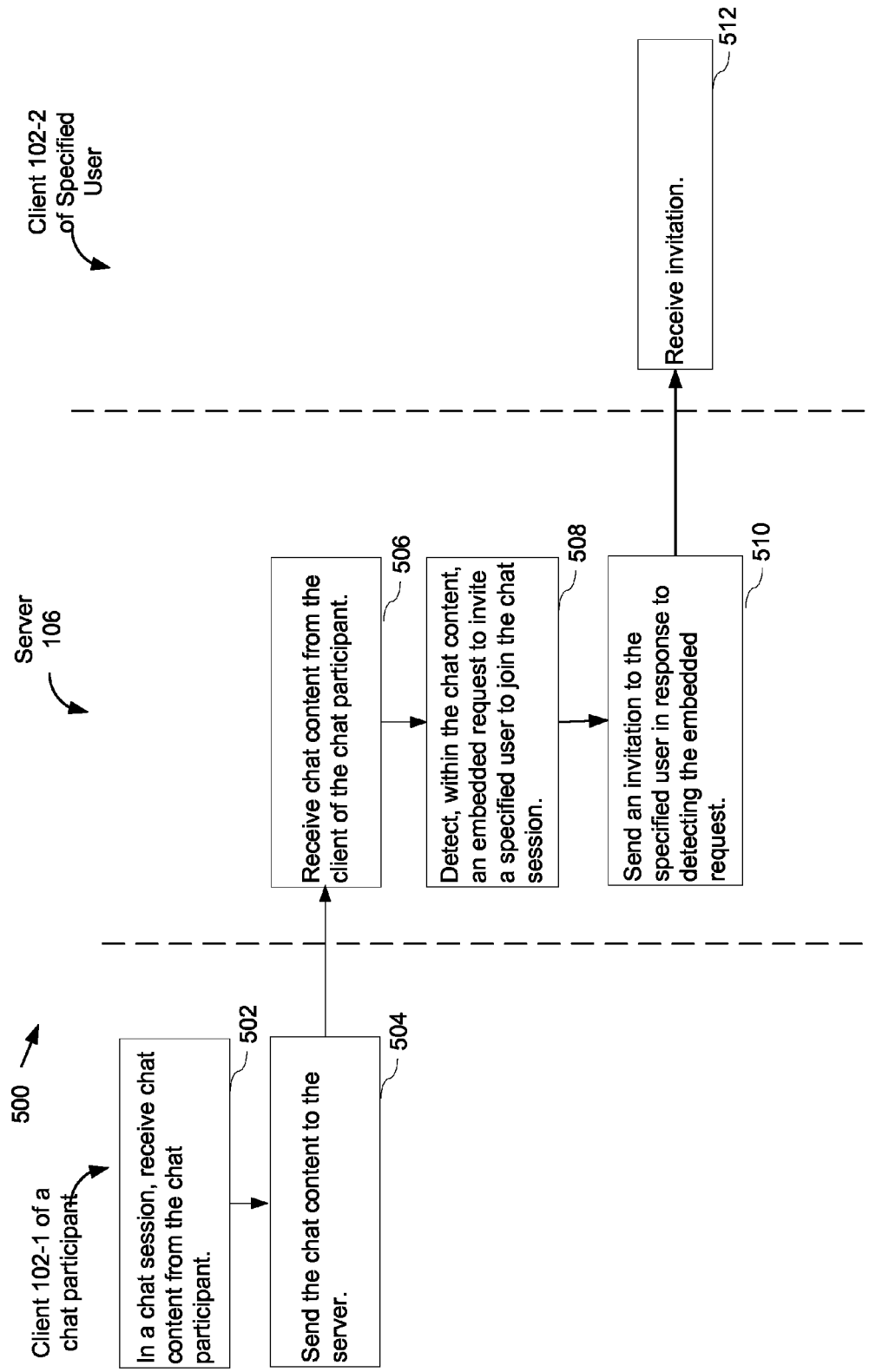
FIG. 5 is a flowchart illustrating a process of inviting a user to a chat session according some embodiments.
Figure 7A:
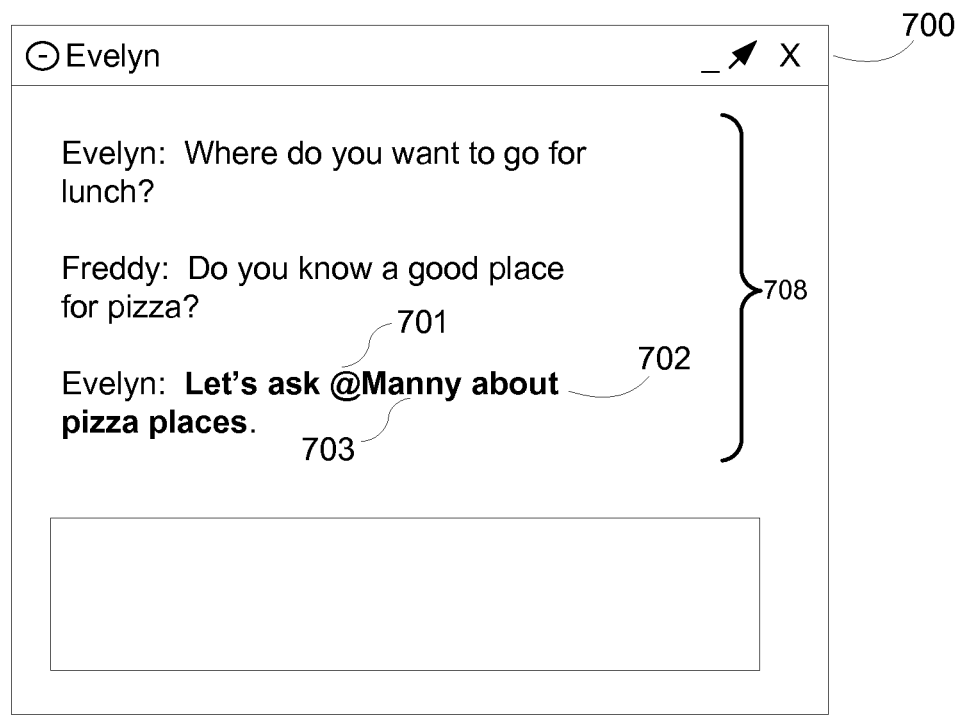
FIGS. 7A, 7B, 7C and 7D are an exemplary schematic screenshots of inviting a user to a chat session, document editing session and chat/document editing session according to some embodiments.
Figure 7B:
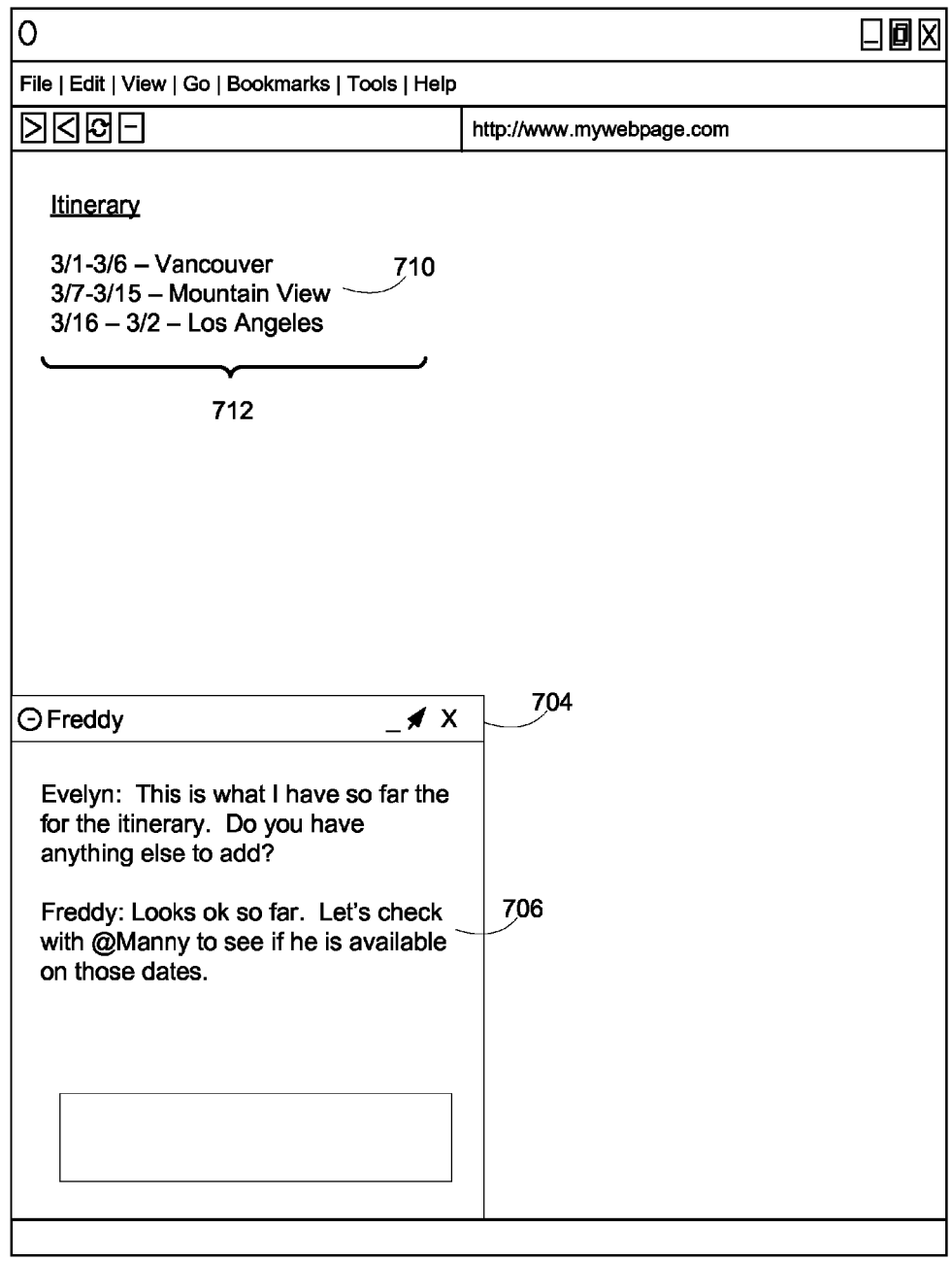

Attention is now directed to the flow diagram in FIG. 5, illustrating a process 500 of inviting a user to a chat session using inline user addressing, according some embodiments. At a client 102-1 of a chat participant, chat content from the chat participant is received in a chat session. (502) The chat content may include any combination of text, voice, video and images. In some embodiments, as shown in FIG. 7B, the chat session 704 takes place in conjunction with a document editing session 712. For example, chat content is sent from a chat participant's client 102-1 to server system 106. (504) At server system 106, the chat content by a chat participant is received from the chat participant's client 102-1. (506) In this example, we assume that the chat content by the chat participant includes an embedded request, embedded in the chat content, to invite a specified user to join the chat session. The embedded request is detected within the chat content. (508) FIG. 7A shows an example of an embedded request 702 within chat content 708. Server system 106 sends a chat invitation to the client 102-2 of the specified user in response to detecting the embedded request. (510) The client 102-2 of the specified user receives the invitation. (512)

Figure 8A:
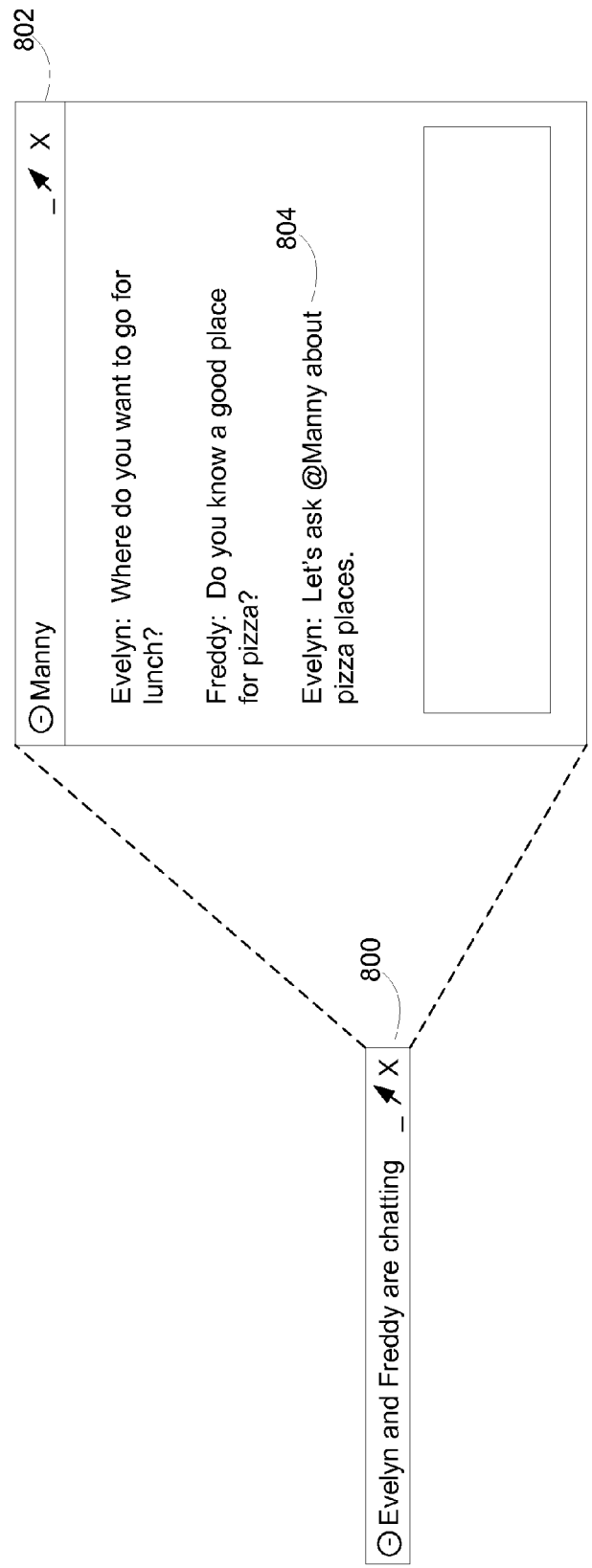
FIGS. 8A, 8B, 8C and 8D are exemplary schematic screenshots of receiving an invitation according to some embodiments.
Figure 8B:
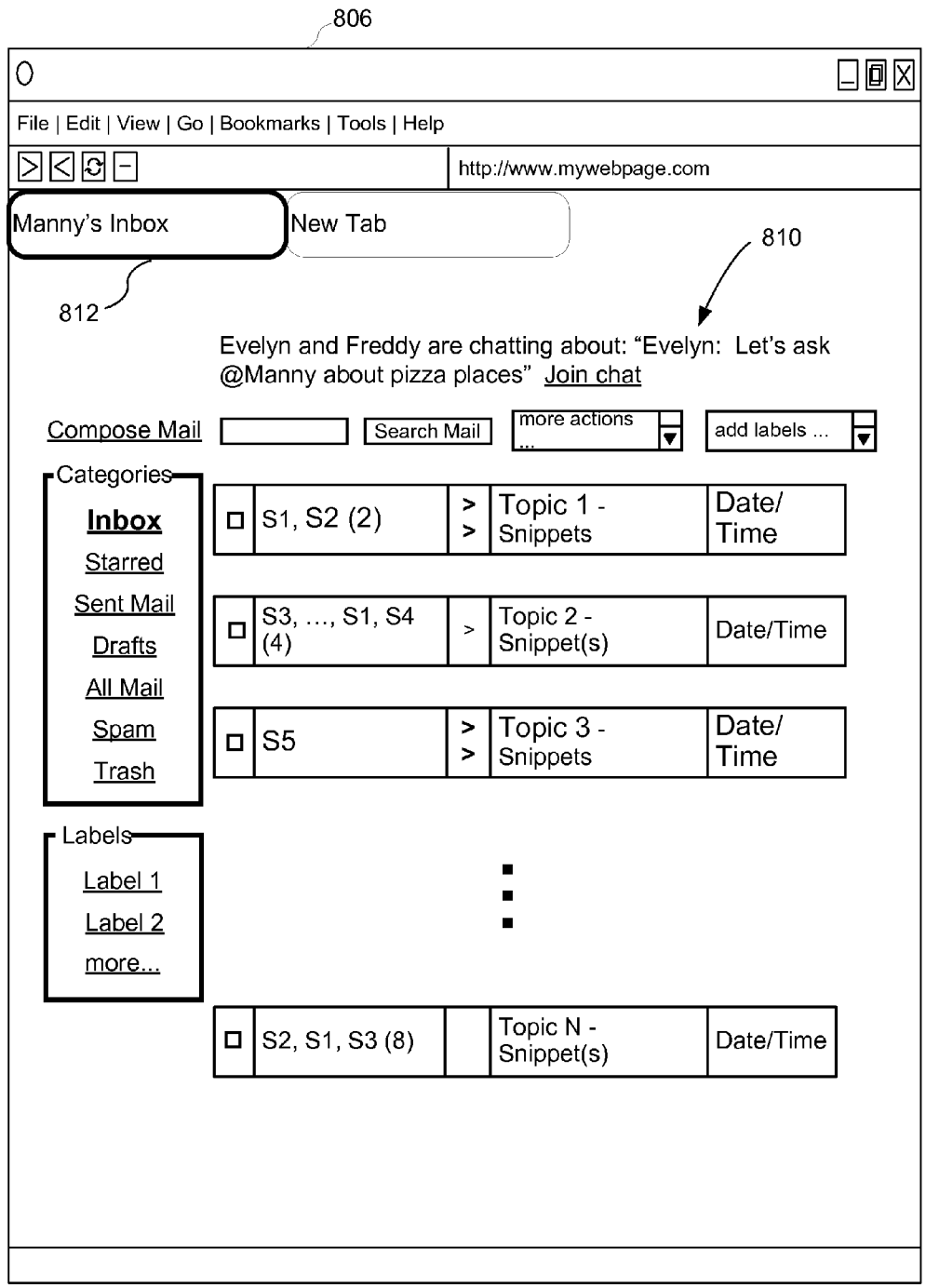
Figure 8C:
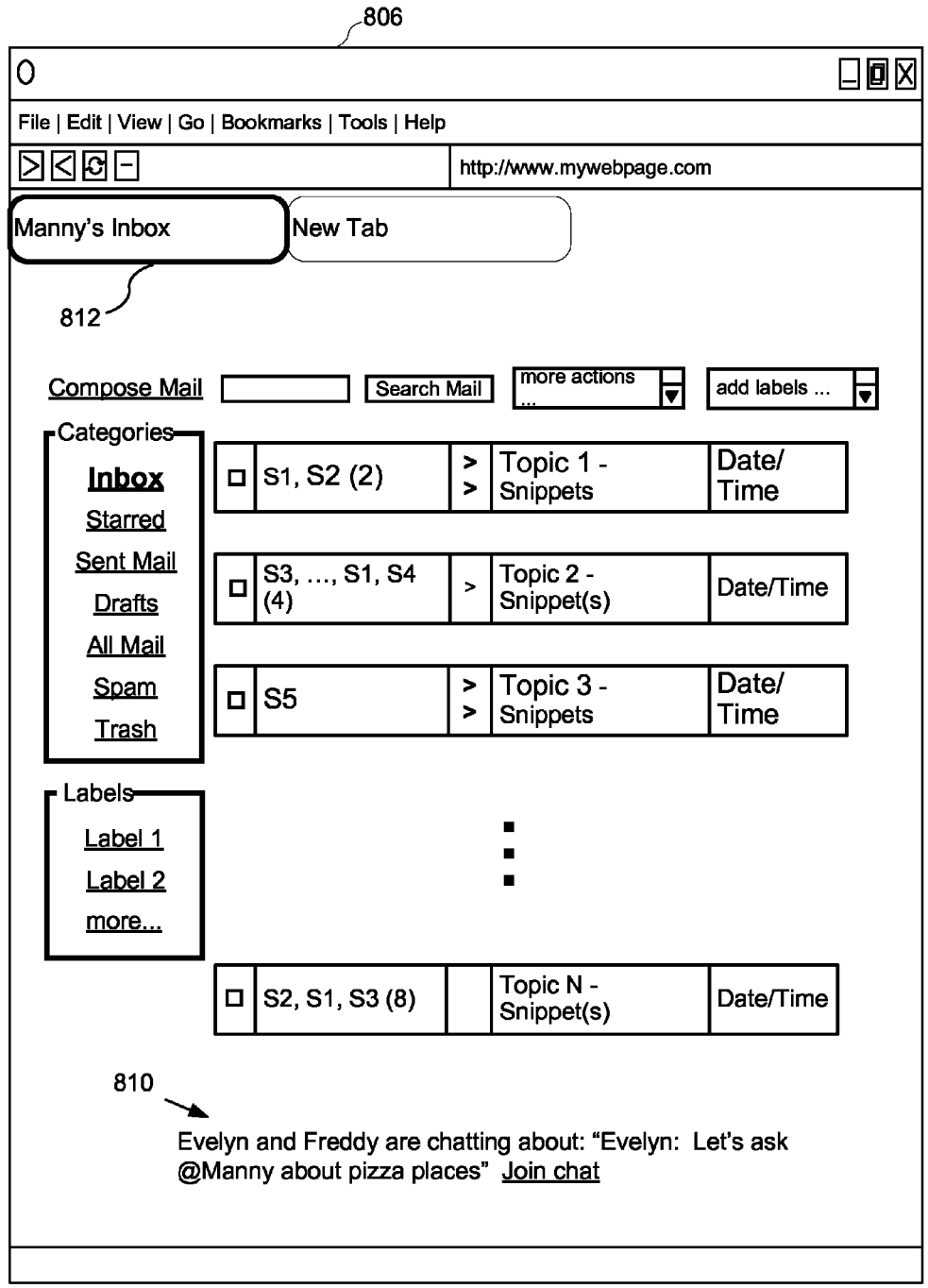
Figure 8D:
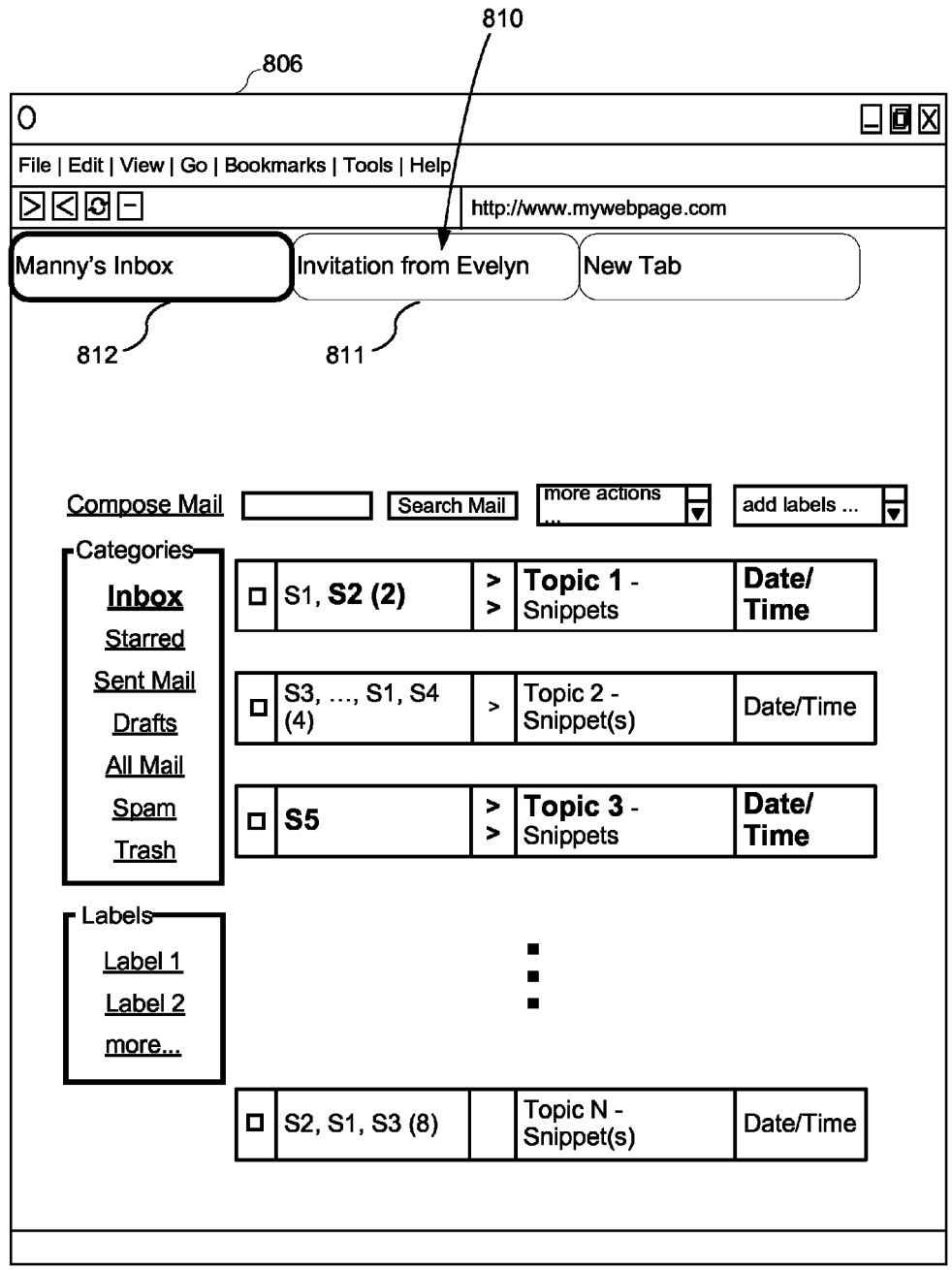

The invitation is sent to the specified user in a number of different ways, depending on whether the user is using an application connected to server system 106 and what application windows are active or inactive on the user's screen. For example, as shown in FIG. 8A, if the invited user is logged into a chat application connected to server system 106, the invited user receives a chat notification 800 or a chat window 802 is automatically opened on the user's screen. In some embodiments, the specified user receives the invitation through an active window of an application connected to server system 106. In a non-limiting example, as shown in FIGS. 8B and 8C, the invited user receives the invitation 810 through an active window 812 of an email application. In some embodiments, the specified user is notified of the invitation or receives the invitation through an inactive window of an application connected to server system 106. For example, as shown in FIG. 8D, the specified user receives the invitation 810 through an inactive web browser tab 811. In some embodiments, the inactive web browser tab 811 displays a notification of the invitation and when the user selects the inactive the window (e.g., inactive web browser tab 811 of FIG. 8D), the invitation is displayed in the now active window, as in the examples shown in FIGS. 8A, 8B and 8C.

In some embodiments, the invitation is sent to the specified user in an email message or SMS message. For example, if for the specified user to whom an invitation is directed there is no active or inactive application or window connected to server system 106, the invitation is sent in an email message or SMS message.

Figure 6:
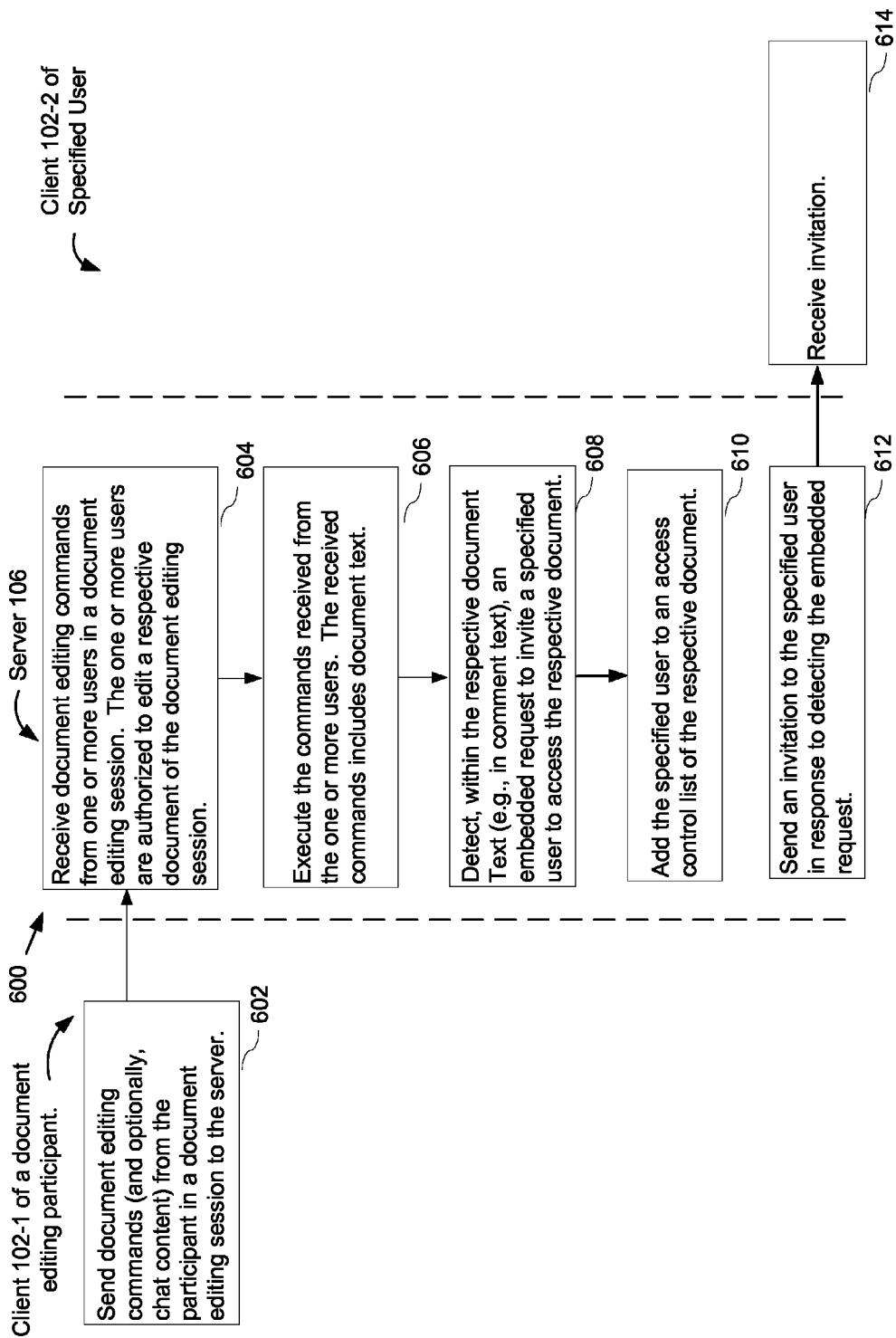
FIG. 6 is a flowchart illustrating a process of inviting a user to a document editing session according some embodiments.

Attention is now directed to FIG. 6 which is a flow diagram illustrating a process 600 of inviting a user to a document editing session through the use of inline user addressing, according some embodiments. At the client device 102-1 of a document editing participant (who is the process of creating and/or editing a document), document editing commands from the participant in a document editing session are sent to server system 106. In some embodiments, the document editing commands include one or more of: text, drawings, images, video and sounds and changes to text, drawings, drawings, sounds and images. Optionally, the document editing commands include two or more of: text, drawings, images, video and sounds and changes to text, drawings, drawings, sounds and images.

Figure 7C:
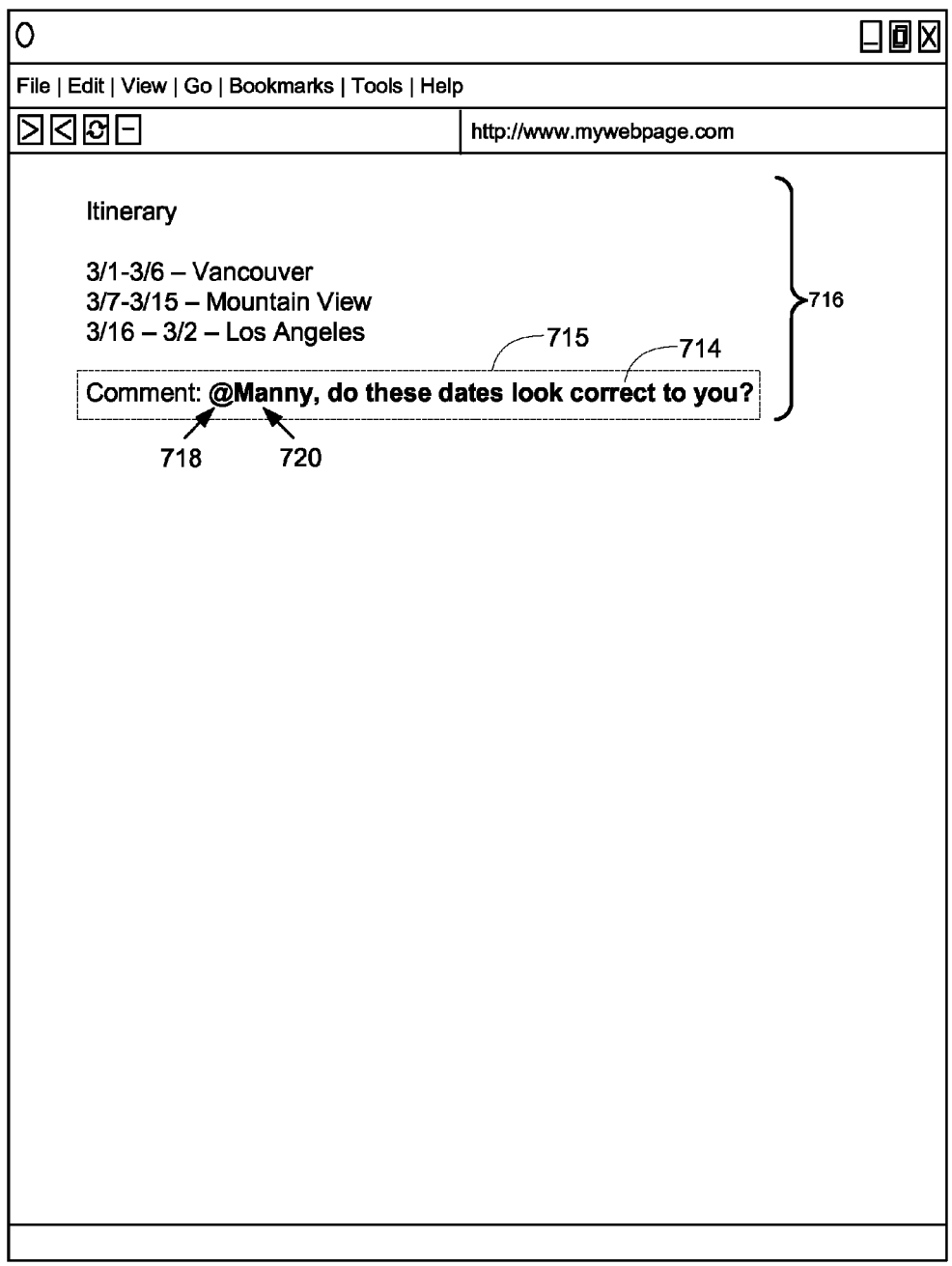

In some embodiments, chat content from a chat session that is associated with the document editing session is sent to server system 106. At server system 106, document editing commands from one or more users in a document editing session are received. (604) The one or more users from whom the editing commands are received are users who are authorized to edit a respective document of the document editing session. (604) The server system 106 executes commands received from the one or more users and updates the respective document. (606) The received editing commands include document text, such as document text being added to the document, document text being removed from the document, and/or document text that is being revised by the editing commands (606) Server system 106 detects, within the respective document text, an embedded request to invite a specified user to access the respective document. (608) For example, as shown in FIG. 7C, the embedded request 714 is within the document content 716. More specifically, in this example the embedded request 714 is within comment text (in the document content) added to the document by editing commands (e.g., an "add comment" or "edit comment" command). Stated another way, the document text in the received commands includes comment text to be included in a comment in the document, and the comment text includes the embedded request. Server system 106 adds the specified user to the access control list of the respective document in response to detecting the embedded request. (610) Server system 106 also sends an invitation to the specified user in response to detecting the embedded request. (612) The client 102-2 of the specified user receives the invitation from server system 106. (614) The invitation is sent to the specified user in a similar manner as discussed with respect to FIG. 5.

Inline User Addressing in a Chat Session

As discussed above, it typically takes several steps to guide a new user into the conversational flow of a chat session. The methods described herein using inline user addressing make it easier to guide a new user into the conversational flow of a chat session. To invite a specified user to a chat session using inline user addressing, the inviting user enters an embedded request into the content of the chat session. Inviting a user to a chat session by entering an embedded request into the chat content is convenient for the inviting user since the inviting user does not have to leave the chat session, nor use any menus or menu options associated with the chat session. Also, since the embedded request is within the chat content, the other chat participants of the chat session are notified that the user has been invited to the chat session. The embedded request also distinguishes to the invited user the portion of the chat content that is relevant to the invited user. After joining the chat session, the invited user may read the portion of the chat content containing the embedded request to understand why the user was invited to the chat session. Further, the chat invitation sent to the invited user may include portions of the chat content to help the invited user understand why he or she is being invited to the chat session. As a result, the chat participants do not have to spend time repeating or summarizing portions of the chat conversation to the invited user before asking the invited user whatever it is that the invited user was invited for.

Figure 9A:
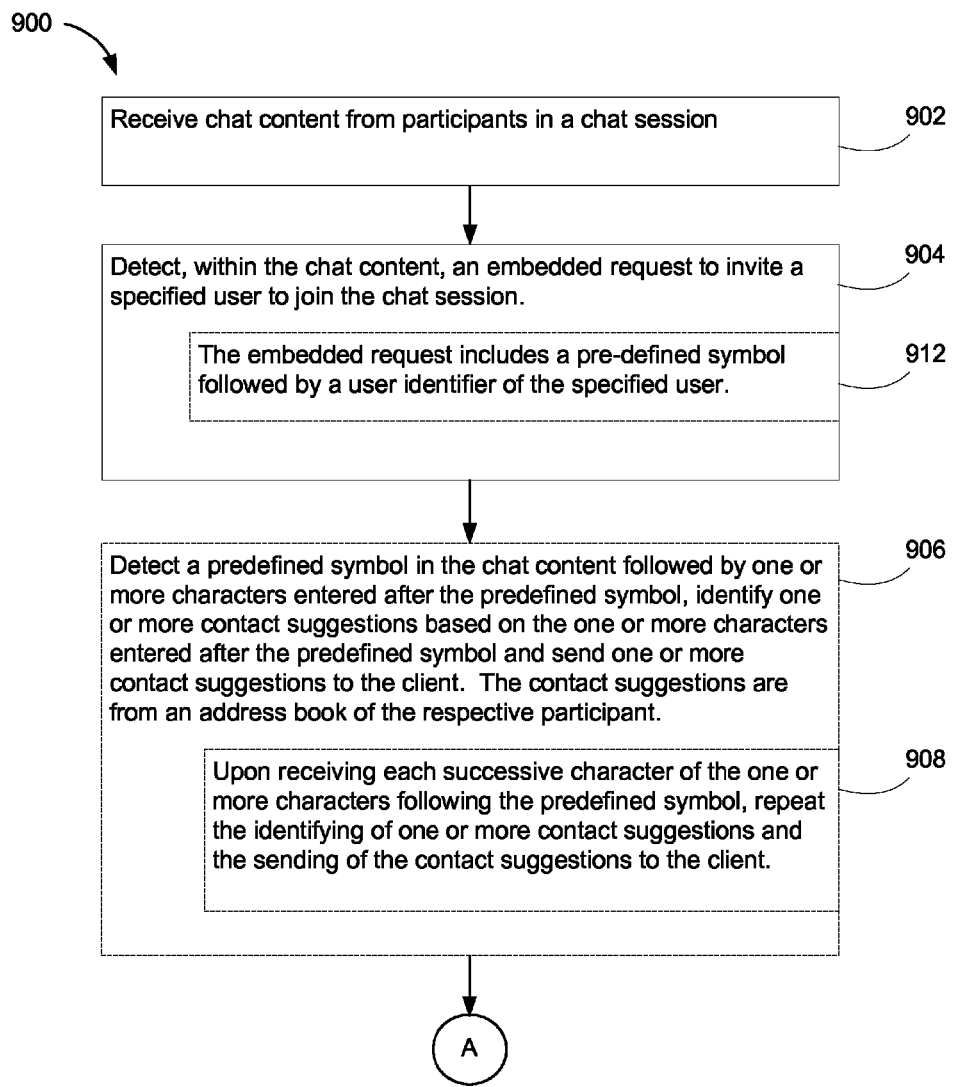
FIGS. 9A, 9B and 9C are flowcharts illustrating the process of inviting a user to a chat session according to some embodiments.
Figure 9B:
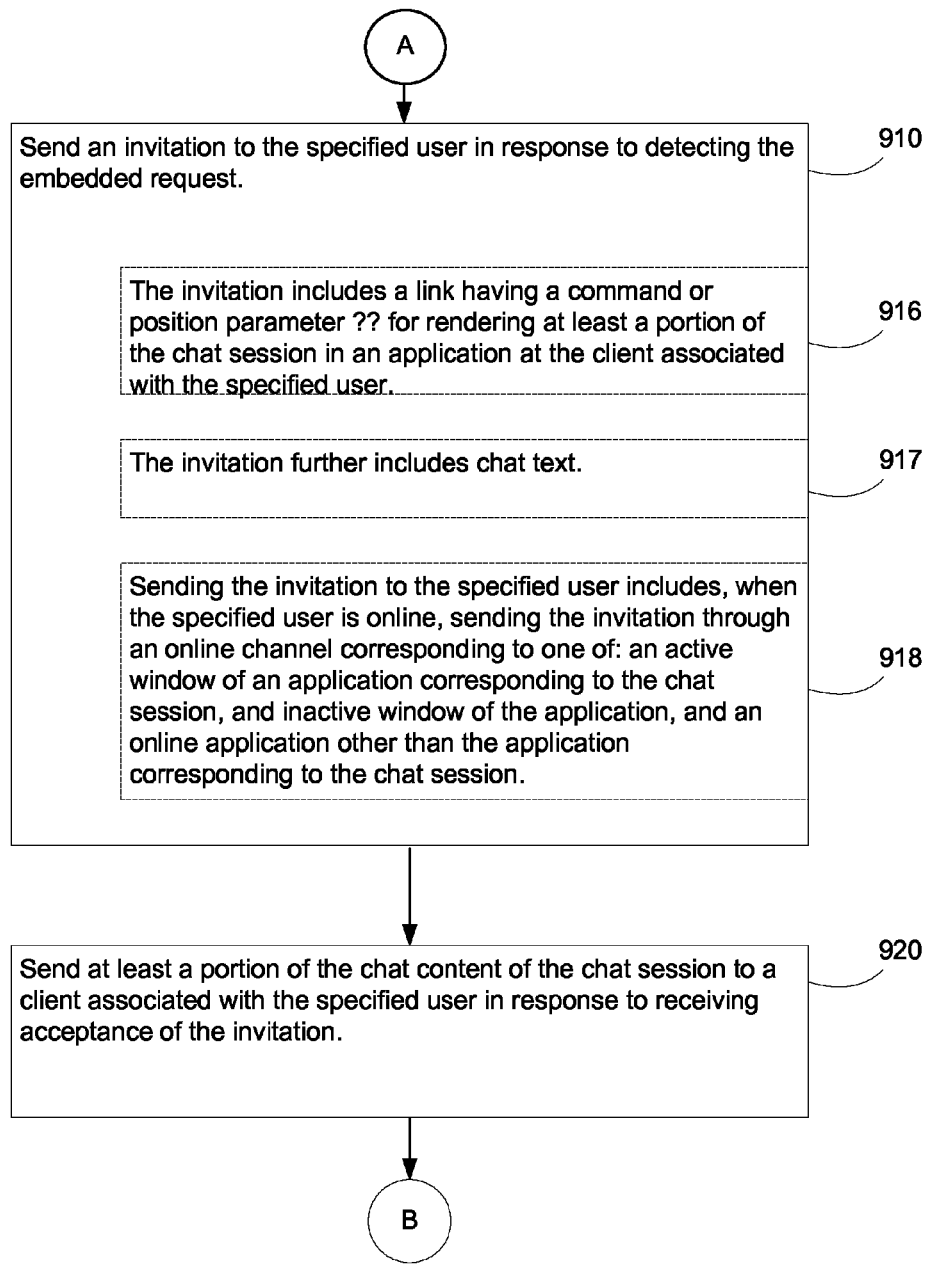
Figure 9C:
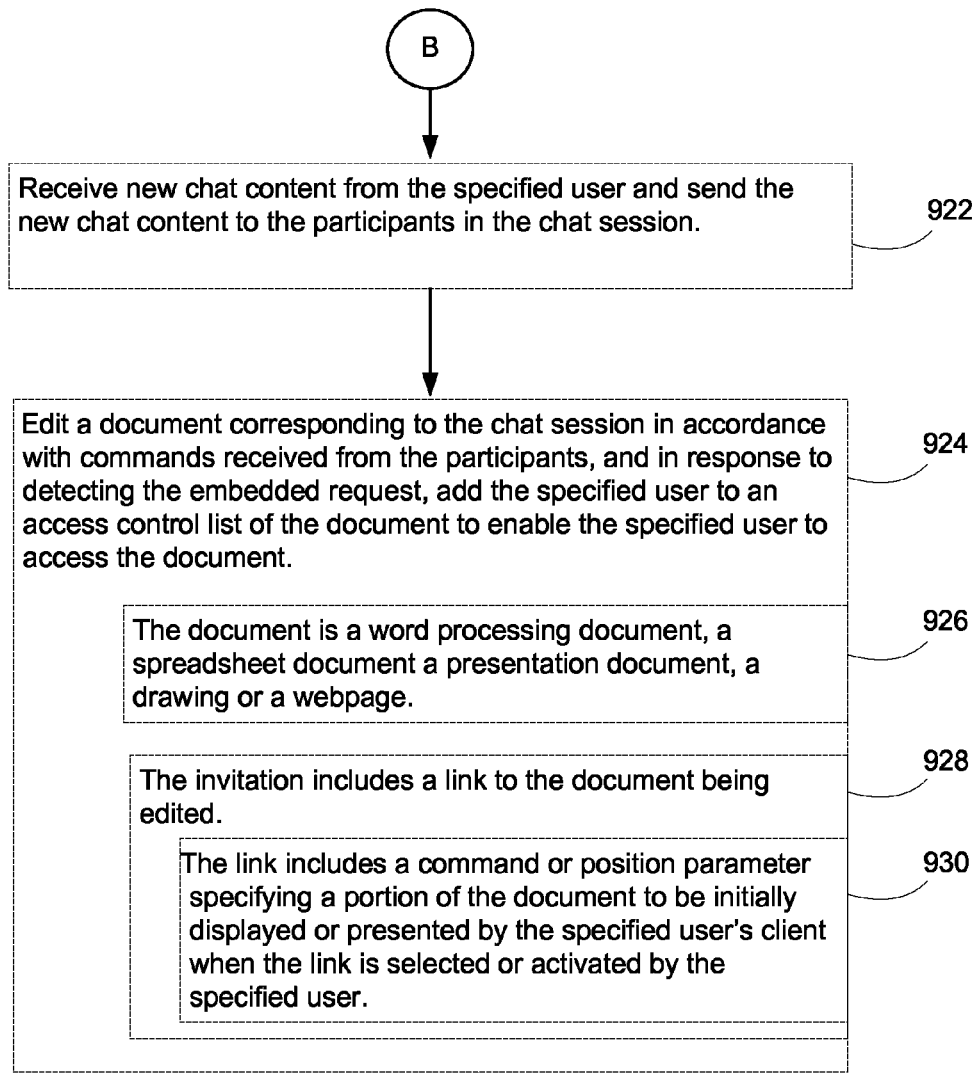

FIGS. 9A, 9B and 9C are flow diagrams illustrating a method 900 of inviting a user to a chat session using inline addressing in accordance with some embodiments. Method 900 is performed at server system 106.

Attention is now directed to FIG. 9A which illustrates the method 900 of inviting a user to a chat using inline addressing in accordance with some embodiments. Chat content from participants in a chat session is received. (902) The chat content includes any combination of text, audio content, video content, drawings and images. The chat content is received from one or more client devices 102 connected to server system 106. The chat content is stored in a chat data structure 422 in the chat/document database 120.

An embedded request to invite a specified user to join the chat session is detected within the chat content. (904) In some embodiments, the embedded request is detected by inline addressing module 114 in server system 106. In some embodiments, the embedded request includes a predefined symbol followed by a user identifier of the specified user. (912) In a non-limiting example, as shown in FIG. 7A, the embedded request 702 includes a predefined symbol 701 (e.g., "@") followed by a user identifier 703 (e.g., "Manny"). The predefined symbol can be one or more symbols, one or more alphabet characters, one or more numbers, one or more icons or any combination thereof. The user identifier of the specified user may be any piece of contact information stored for the specified user in the address book of a respective chat participant. The address books are stored in the address book database 118. In some embodiments the user identifier is selected from a group consisting of names, chat usernames, nicknames, email addresses, email usernames (an email username is the portion of an email address preceding the at sign), and telephone numbers. As noted above, inviting a user to a chat session by entering an embedded request into the chat session is convenient for the inviting user since the inviting user does not need to leave the chat window of the chat session and does not need to use a sequence of menus or menu options associated with the chat session. Also, since the embedded request is within the chat content, the other chat participants of the chat session are notified that the specified user has been invited to the chat session.

In some embodiments, detecting the embedded request (904) includes detecting a predefined symbol in the chat content followed by one or more characters entered after the predefined symbol, identifying one or more contact suggestions based on the one or more characters entered after the predefined symbol and sending the one or more contact suggestions to the client. (906) In some embodiments, the contact suggestions are obtained from an address book of the respective participant. (906) In some implementations, each contact suggestion results from matching the one or more characters entered after the predefined symbol with contact information for a respective contact stored in the address book of the respective chat participant. Optionally, the one or more characters entered after the predefined symbol are matched with information in any field (e.g., first name, last name, username, mailing address or any portion of the mailing address (e.g., street number, street name, city, state, zip code, etc.), telephone number, business name, job title, text content in other fields) of a respective contact entry in the address book of the respective chat participant.

In some embodiments, upon receiving each successive character of the one or more characters following the predefined symbol, the operations of identifying one or more contact suggestions and sending contact suggestions to the client are repeated. (908) Stated in another way, after the predefined symbol is received by inline addressing module 114, inline addressing module 114 repeatedly sends new user identifier suggestions to the client 102 of the chat participant after each successive character is received until the chat participant either selects a suggestion or completely enters the user identifier information. Contact suggestions are sent to the client 102 of the chat participant in order to assist the chat participant in entering an embedded request. In some embodiments, inline addressing module 114 determines the contact suggestions in response to detecting the predefined symbol and one or more characters entered after the predefined symbol.

In some embodiments, the embedded request is visually distinguished in the chat session. In some embodiments, in response to detecting the embedded request in chat content entered by a respective participant, inline addressing module 114 adds display instructions to the chat content to visually distinguish the embedded request and then sends the chat content to the other chat participants of the chat session for display. In some embodiments, the embedded request and a pre-defined amount of chat content before and/or after the embedded request is visually distinguished. In some embodiments, the embedded request and/or the pre-defined amount of chat content before and/or after the embedded request is visually distinguished by bolding, underlying, italicizing, changing font style, adding a graphical indicator, blinking/flashing, font effects (e.g., shadowing, outlining, embossing and engraving), highlighting or any combination thereof. The predefined symbol, the user identifier and a pre-defined amount of text before and/or after the predefined symbol may each be individually distinguished. In other words, the predefined symbol, the user identifier and the pre-defined amount of text may all be visually distinguished in different ways. In a non-limiting example, in FIG. 7A, the embedded request 702, "Let's ask @Manny about pizza places" is visually distinguished with bolding. In a non-limiting example, the predefined symbol may be assigned the color red, the user identifier may be underlined and a pre-defined amount of chat content before and/or after the predefined symbol is highlighted in yellow. Visually distinguishing the embedded request alerts the other participants in the chat session that a specified user has been invited to the chat session. In some embodiments, the embedded request is only visually distinguished to the inviting user. In some other embodiments, the embedded request is visually distinguished to all of the chat participants. Optionally, instructions to visually distinguish the embedded request and/or additional chat content are saved with the chat content in the chat/document database 120. As a result, a user viewing the chat content of an active or inactive chat session will see that the embedded request is visually distinguished.

In some embodiments, in response to detecting the embedded request, inline addressing module 114 adds the user specified by the embedded request to the access control list (e.g., access control list 426) of the respective chat session (e.g., chat 422) that the specified user is invited to. The specified user now at least as the access rights to join the chat session. In some embodiments, the specified user is added to the access control list of the respective chat session before the invitation corresponding to the embedded request is generated. Alternatively, the specified user is added to the access control list of the respective chat session in response to acceptance of the invitation by the specified user.

In some embodiments, the specified user is added the access control list of one or more documents associated with the chat session that the specified user is invited to. Typically, the access rights assigned to the specified user are not greater than the access right of the user requesting the invitation. Thus, if the user requesting the invitation has read-only access to the document associated with a chat session, the user specified by the request will also be assigned read-only access, and will not be assigned read-write access to the document, unless the specified user already had read-write access to the document prior to receiving the invitation.

In some implementations, a document's ACL can be configured to prevent non-owners, such as editors or viewers, to add other people to the document's ACL. In such implementations, when a non-owner attempts to embed a request to invite in a document or in a chat session associated with the document, the document manage system or document editor will take remedial action. In one example, the remedial action is to display a warning to the non-owner that they do not have sufficient rights to send an invitation to edit or view the document. In another example, auto-completion of the user identifier (see operation 1012, FIG. 10A) that follows the predefined symbol is not enabled, thereby discouraging the non-owner from attempting to enter a complete request. Alternatively, in yet another example, a request by a non-owner is redirected to an owner of the document, to determine if they want to send an invitation to the specified user.

Optionally, in some implementations, a user (e.g., a document owner or co-owner) with the right to grant other users read or write access to a document to other users can specify a level of access rights in the embedded request to invite, by including a predefined access parameter, such as RW (enabling read-write access) or RO (enabling read only access), in the embedded request. In yet another implementation (see schematic screenshot in FIG. 7D), when the auto-completion feature of the inline addressing module 114 sends to the user's client device a list 722 of user identifiers or user names consistent with a partially entered user identifier or user name, for presentation in a user interface of the client device, an affordance 724 is presented next to each name in the list 722 that, when selected, presents a dialog (not shown) allowing the user to select the level of document access (e.g., read or read-write access) to be granted to the specified user. Alternatively, the affordance 724 is displayed only when the user selects, or alternatively hovers a cursor (not shown) over or "right clicks" or otherwise references, a respective user identifier or user name in the list 722.

Attention is now directed to FIG. 9B. In some embodiments, an invitation corresponding to the embedded request is generated by inline addressing module 114 in response to detecting the embedded request. An invitation to the specified user is sent in response to detecting the embedded request. (910) In some embodiments, the invitation includes a link having a command or position parameter specifying a portion of the chat session to be initially displayed or presented by the specified user's client (e.g., in an application at the client associated with the specified user) when the link is selected or activated by the specified user. (916) In some embodiments, when the link is selected by the specified user, a new chat window opens at the client 102 used by the specified user, and the specified user joins the chat session. Optionally, the new chat window includes a pre-determined amount of chat content/chat history. In some embodiments, the pre-determined amount of chat content/chat history includes the embedded request. The chat content/chat history displayed in the new chat window at the specified user's client corresponds to chat content that took place before the specified user joined the chat session. In some embodiments, the link includes instructions to navigate the specified user's chat application to the portion of the chat content that contains the embedded request.

An example of an invitation link is
<a href=www.docserver123.com/inline?ci=ChatID&loc=CLocID>Invite Text</a>
Where www.docserver123.com/inline identifies the server and service, "ChatID" identifies the chat to which the specified user is being invited, "CLocID" identifies a location within the chat content of the ChatID chat that is to be shown upon user activation of the link, and "Invite Text" is the text of the invitation, including, for example, the portion of the chat session that is to be shown to the specified user. Optionally, in implementations in which the chat session is associated with a document editing session, the invitation link further includes a document identifier and a document location parameter or command, thereby specifying a document to be displayed to the specified user upon activation of the invitation link, and a location within the document or a portion of the document that is to be initially displayed upon activation of the invitation link.

In some implementations, the invitation further includes chat text. (917) In a non-limiting example, as shown in FIG. 7A, the chat text, "Let's ask" and "about pizza places" is included in the invitation. In some embodiments, a pre-defined amount of chat content before and/or after the embedded request is included in the invitation. For example, a few paragraphs/sentences/words before and/or after the embedded request is included in the invitation. It is noted that chat content after the embedded request can be included in an invitation when, for example, the invitation is resent after an initial transmission of the invitation doe not result in acceptance of the invitation. In another example, when chat content is being contributed to the chat at a high rate (e.g., at a rate that exceeds a predefined threshold T) immediately before and during composition of the embedded request, transmission of the invitation is delayed until there is either a pause in the chat session for at least a predefined period of time (e.g., a pause that exceeds 5 seconds), or the amount of chat content after the embedded request exceeds a pre-defined threshold (e.g., 50 or 100 characters). The chat text, when included in an invitation to the specified user, helps the specified user/invited user understand why he or she is being invited to the chat session.

In some embodiments, the invitation to the specified user includes, when the specified user is online, sending the invitation through an online channel corresponding to one of: an active window of an application corresponding to the chat session, and inactive window of the chat application, and an online application other than the application corresponding to the chat session. (918) As shown in FIG. 8A, if the specified/invited user is logged into a chat application (e.g., chat application 122 or webpage with chat application 230) that is connected to server system 106, the specified user receives a chat notification 800 or a chat window 802 automatically appears on the user's chat application. In some embodiments, the chat application (e.g., chat application 122 or webpage with chat application 230) is integrated within another application such as a document editing application (e.g., document editing application 124 or webpage with document editing application 232) or email application.

If the specified user is not logged into a chat application, the specified user may receive the invitation though an active or inactive window of another application (e.g., browser 128) connected to server system 106. In a non-limiting example, as shown in FIGS. 8B and 8C, the specified user receives the invitation 810 through an active window 812 of an email application. In another example, shown in FIG. 8D, the specified user receives the invitation 810 through an inactive web browser tab 811. In some embodiments, the inactive web browser tab 811 displays a notification of the invitation and when the specified user selects the inactive the window (e.g., inactive web browser tab 811 of FIG. 8D), the invitation is displayed somewhere in the now active window.

In some embodiments, the invitation is sent to the specified user in an email message or SMS message. In some implementations, the invitation is sent in an email message or SMS only if the specified user is not currently using any application connected (i.e., having a real-time or ongoing connection) to server system 106. In other words, how the specified user receives the invitation depends on whether the specified user is using one or more applications (e.g., 122, 124, 126, 128, 230, 232, and 234) connected to server system 106 and what application windows of those one or more applications are active or inactive on the specified user's client 102.

At least a portion of the chat content of the chat session is sent to a client associated with the specified user in response to receiving acceptance of the invitation. (920) In some embodiments, a pre-defined amount of chat content before and/or after the embedded request is sent to the client 102. The chat content is typically displayed in a chat window or other chat user interface, or otherwise presented (e.g., via text to speech translation) to the specified user via the client 102. For example, a few paragraphs/sentences/words before and/or after the embedded request is sent to the specified user's client 102. The chat content sent to the specified user's client 102, and presented to the specified user by client 102, helps the specified user understand what the chat participants are currently chatting about.

Attention is now directed to FIG. 9C. In some embodiments, new chat content is received from the specified user and the new chat content is sent to the participants in the chat session. (922) In other words, the specified user is a participant of the chat session and has sufficient access rights to send chat content to the other participants of the chat session.

In some embodiments, a document corresponding to the chat session is edited in accordance with commands received from the participants. (924) In other words, the chat session is associated with a document editing session otherwise called a chat+document editing session. In some embodiments, the embedded request to invite a specified user to the chat+doc editing session is detected within the document editing session. In some embodiments, the specified user is added to an access control list of the document to enable the specified user to access the document in response to detecting the embedded request. (924) In some embodiments, the specified user is added to the access control list of the document and the chat before the invitation is generated and sent to the specified user. However, in some embodiments, the access control list of the document is modified only if the specified user is not already listed in the access control list with at least the level of access associated with the invitation. Alternatively, if the specified user is not already listed in the access control list with at least the level of access associated with the invitation, the specified user is added to the access control list of the document in response to acceptance of the invitation by the specified user. Optionally, the operations of detecting the embedded request, modifying the access control list of the document, and generating the invitation are performed by inline addressing module 114 of server system 106.

In some embodiments, the document is a word processing document, a spreadsheet document, a presentation document, a drawing or a webpage. (926) In some embodiments, the invitation includes a link to the document being edited. (930) Optionally, the link includes a command or position parameter specifying a portion of the document to be initially displayed or presented by the specified user's client when the link is selected or activated by the specified user. (930) In some embodiments, the link includes one or more instructions to open the document at a position corresponding to portion of the document containing the embedded request. As a result, when the specified user accesses the document using the link, the specified user initially views the portion of the document containing the embedded request.

Optionally, the instructions in the link are instructions sent to server system 106 when the link is selected or otherwise activated by the user. Optionally, the instructions in the link are instructions that instruct the specified user's document editing application (e.g., document editing application 124 or web page with document editing application 232) to open the document and to display or otherwise present to the specified user the portion of the document containing the embedded request.

Inline User Addressing in a Document Editing Session

As discussed above, it typically takes several steps to guide a new user into a document editing session. The methods described herein, using inline user addressing, make it easier to guide a new user into a document editing session. To invite a specified user to a document editing session using inline user addressing, the inviting user enters an embedded request into the content of a document associated with the document editing session. Inviting a user to a document editing session by entering an embedded request into the document content is convenient for the inviting user since the inviting user does not need to use any menu options associated with the document editing session. Also, since the embedded request is within the document content, the other document editing participants of the documents editing session are notified that the specified user has been invited to the document editing session. The location of the embedded request within the document also serves as a marker, which can be useful in directing the specified user to the portion of the document that contains the embedded request. After joining the document editing session, the specified user can read the portion of the document content containing the embedded request to understand why the user was invited to the document editing session.

Alternatively, in a chat+document editing session, when the request is embedded in the chat session associated with a document editing session, the resulting invitation includes a navigation command for presenting to the user the same portion of the document that was being viewed by the user who created the embedded request while creating the embedded request. For example, if there is a cursor position, in the document, associated with the user who created the embedded request, the cursor position is conveyed with the embedded request to server system 106, which includes the aforementioned corresponding navigation command in the invitation.

Optionally, the document invitation sent to the specified user includes a portion of the document content to help the specified user understand why he or she is being invited to the document editing session. Optionally, the invitation includes a command (e.g., a navigation command) for positioning or rendering the document, in an application at the client associated with the specified user, so as to initially present to the specified user the portion of the document that contains or that is associated with the embedded request. As a result, the document editing participants do not have to spend time directing the specified user to the relevant portion of the document.

Figure 10A:
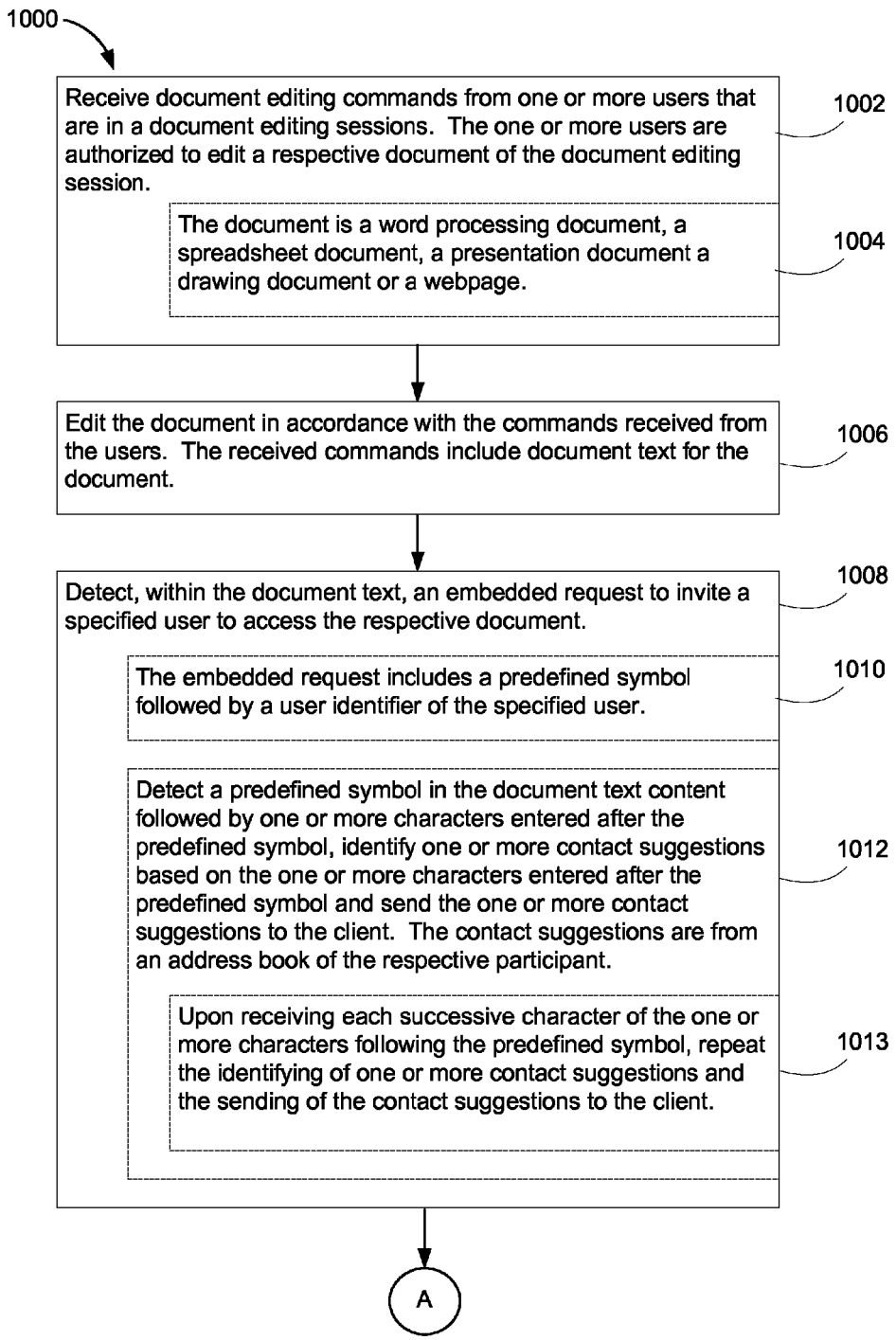
FIGS. 10A and 10B are flowcharts illustrating the process of inviting a user to a document editing session according to some embodiments.
Figure 10B:
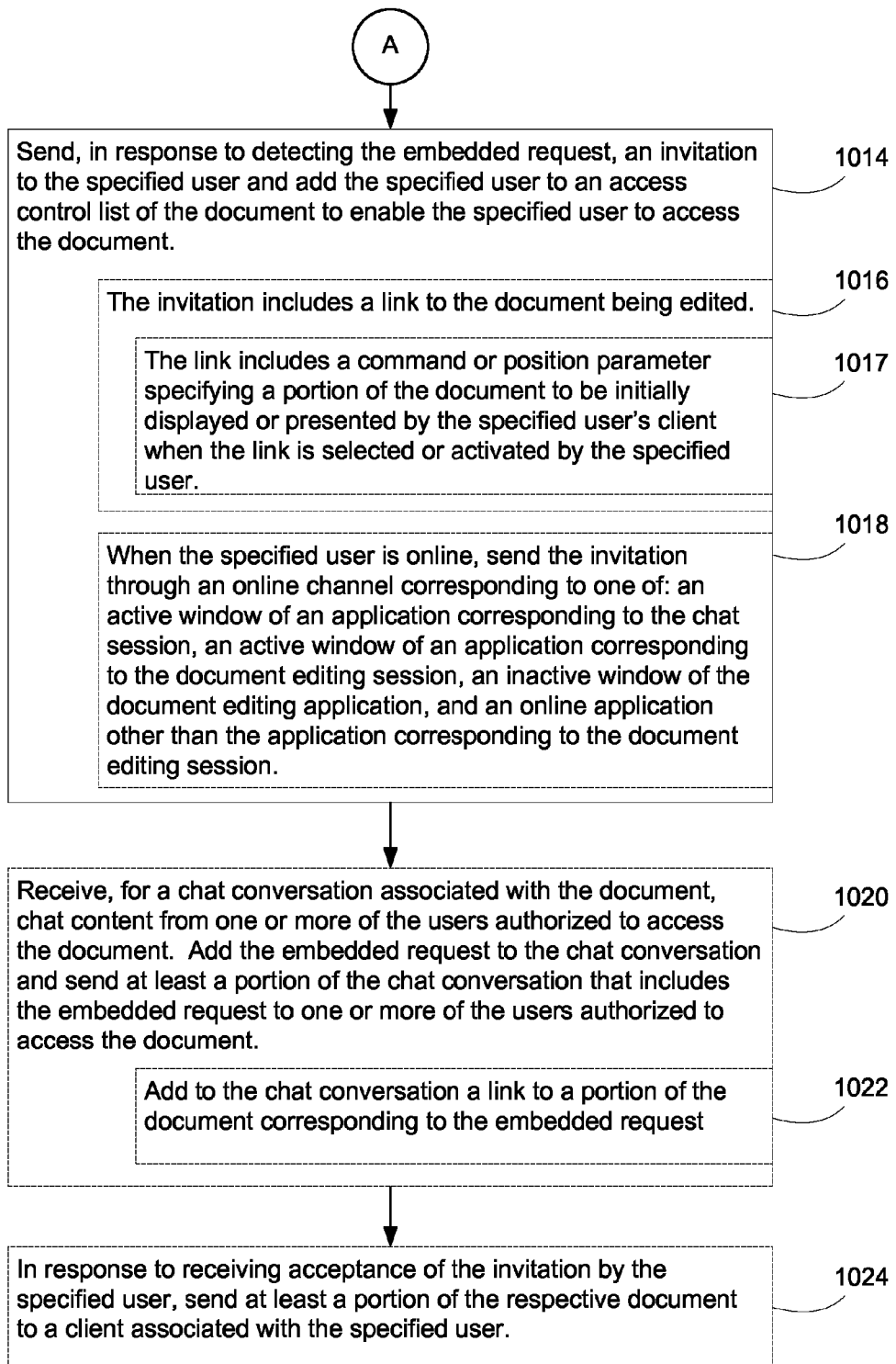

FIGS. 10A and 10B depict a flow diagram of a method 1000 of inviting a user to join a document editing session using inline addressing in accordance with some embodiments. Method 1000 is performed by server system 106.

Document editing commands from one or more users that are in a document editing session are received. (1002) The one or more users from whom the editing command are received are authorized to edit a respective document of the document editing session. (1002) Typically, the document has an access control list (ACL) that lists the users authorized to access the document. The aforementioned users are said to be "on" the document's ACL. The document editing commands are received from one or more client devices 102 connected to server system 106. The received editing commands include document content for the document, such as document text being added to the document, document text being removed from the document, and/or document text that is being revised by the editing commands. (1006)

In some embodiments, the document being edited is a word processing document, a spreadsheet document, a presentation document, a drawing document or a webpage. (1004) The document editing commands can be any command associated with editing word processing documents, spreadsheet documents, presentation documents, drawing documents or webpages.

In some embodiments, the document content in the document editing commands includes any combination of text, audio content, video content, drawings and images. In some embodiments, the document editing commands includes any combination of commands to add, modify and/or delete text, formatting, sounds, animations, drawings, video and images. In a non-limiting example, the document editing commands may include text and one or more commands to bold and indent the text. In another non-limiting example, the document editing commands may include commands to modify a drawing (e.g., changing the color, adding new elements, deleting elements and modifying position of the drawing's elements) in the document. In some embodiments, the document is edited in accordance with commands received from the users. (1006) In some embodiments, the document is stored in chat/document database 120. In some embodiments, inline addressing module 114 receives the document editing commands and in response to receiving the document editing commands, edits the respective document in the chat/document database 120.

An embedded request to invite a specified user to access the respective document is detected within the document text in the received document editing commands. (1008) In some embodiments, the embedded requested is detected by the inline address module 114. In some embodiments, the embedded request includes a predefined symbol followed by a user identifier of the specified user. (1010) In a non-limiting example, as shown in FIG. 7C, the embedded request 714 is located within a user-created comment 715 (indicated in FIG. 7C by a dashed box and the label, "Comment:") and includes a predefined symbol 718 (e.g., "@") followed by a user identifier 720 (e.g., "Manny"). Stated another way, the embedded request is detected within received document editing commands that include comment text to be included in a user-created comment.

The predefined symbol, which marks the beginning of an embedded request in some implementations, can be one or more symbols, one or more alphabet characters, one or more numbers, one or more icons or any combination thereof. The user identifier may be any identifier (typically called a username) stored for the specified user in the address book of the respective document editing participant. In some implementations, address books are stored in address book database 118. In some embodiments, the user identifier is selected from a group consisting of names, chat usernames, nicknames, email addresses, email usernames, and telephone numbers. Inviting a user to access a document (or join a document editing session) by entering an embedded request into the document content is convenient for the inviting user since the inviting user does not need to use any menus or menu options associated with the document editing session. Displaying the embedded request within the document also serves as a notification to other document editing participants, if any, that the specified user has been invited to the document. Typically, the location of the embedded request in the document corresponds to a portion of the document that the inviting user wants the specified user to initially view upon accepting an invitation to join the document editing session.

Figure 7D:
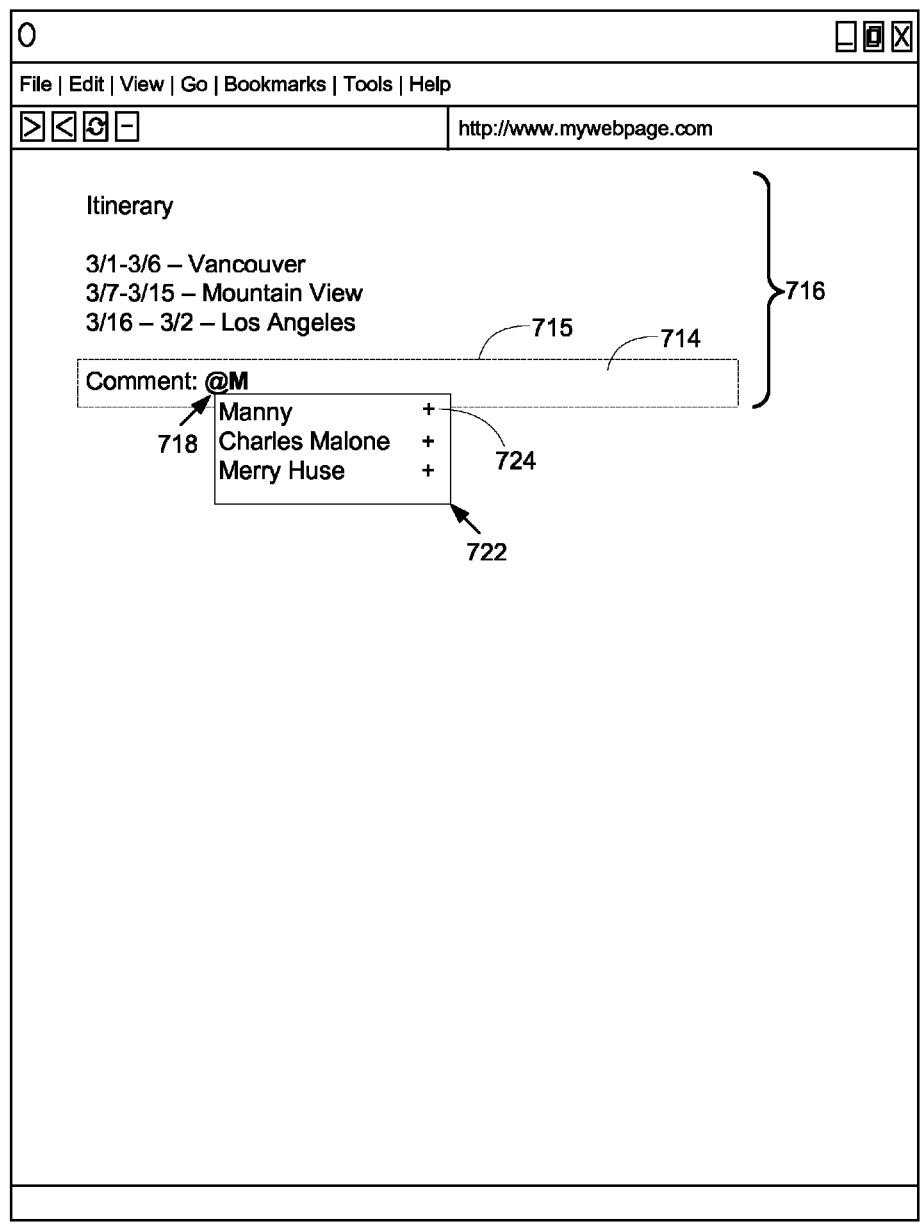

In some embodiments, detecting the embedded request (1008) includes detecting a predefined symbol in the document text content followed by one or more characters entered after the predefined symbol, identifying one or more contact suggestions based on the one or more characters entered after the predefined symbol and sending the one or more contact suggestions to the client. (1012) See, for example, FIG. 7D, which shows a list 722 of contact suggestions based user entry, in a comment 715 in a document, of a predefined symbol 718 (e.g., the at sign, @), followed by the letter "M". FIG. 7D is similar to FIG. 7C, except that the schematic screenshot in FIG. 7D shows a partially entered user identifier ("M") and a list 722 of corresponding contact suggestions, instead of the user identifier 720 shown in FIG. 7C. The identification of one or more contact suggestions is sometimes called auto-completion, or auto-completion of a user identifier. In some embodiments, the contact suggestions are from an address book of the respective participant. (1012) In some implementations, each contact suggestion results from matching the one or more characters entered after the predefined symbol with contact information for a respective contact stored in the address book of the respective chat participant. Optionally, the one or more characters entered after the predefined symbol are matched with information in any field (e.g., first name, last name, username, mailing address or any portion of the mailing address (e.g., street number, street name, city, state, zip code, etc.), telephone number, business name, job title, text content in other fields) of a respective contact entry in the address book of the respective chat participant.

In some embodiments, upon receiving each successive character of the one or more characters following the predefined symbol, the identifying of one or more contact suggestions and the sending of the contact suggestions to the client is repeated. (1013) Stated in another way, after the predefined symbol is received by inline addressing module 114, inline addressing module 114 repeatedly sends new user identifier suggestions to the client 102 of the chat participant after each successive character is received until the chat participant either selects a suggestion or completely enters the user identifier information. In the examples shown in FIGS. 7C and 7D, upon user selection of a suggested user identifier, or complete entry of a user identifier, the user interface will transition from the example shown in FIG. 7D back to the example shown in FIG. 7C. Contact suggestions are sent to the client 102 of the document editing participant in order to assist the participant in entering an embedded request. In some embodiments, inline addressing module 114 determines the contact suggestions in response to receiving the predefined symbol and one or more characters entered after the predefined symbol.

In some embodiments, in response to detecting the embedded request, the embedded request is visually distinguished in the document. For example, in response to detecting the embedded request in the document content entered by a respective document editing participant, inline addressing module 114 adds display instructions to the document content to visually distinguish the embedded request. In some embodiments, the embedded request and a pre-defined amount of document content before and/or after the embedded request is visually distinguished. The manner in which the embedded request and optionally the pre-defined amount of document content is visually distinguished in a manner similar to that described above with respect to visually distinguishing embedded requests in chat content. In some embodiments, the instructions to visually distinguish the embedded request and/or additional document content are saved in or with the respective document. As a result, in some embodiments, a respective user who views the document after the embedded request is entered will see that the embedded request is visually distinguished.

Visually distinguishing the embedded request helps alerts other users of the document, if any, that a new user has been invited to the document. The visually distinguished embedded request also helps the specified user identify a portion of the document that is likely to be relevant to the invitation.

Attention is now directed to FIG. 10B. In some embodiments, an invitation corresponding to the embedded request is generated by inline addressing module 114 in response to detecting the embedded request in the commands for editing a respective document. (1014) Furthermore, some embodiments, in response to detecting the embedded request, inline addressing module 114 adds the user specified by the embedded request to the access control list (e.g., access control list 408) of the respective document (e.g., 402), thereby granting the specified user access to the respective document. In some embodiments, the specified user's access rights are assigned in accordance with one or more commands in the embedded request. In some embodiments, if the document editing sessions has an associated chat session, the specified user is added to the access control list of the associated chat session. In some embodiments, the specified user is added to the access control list of the respective document before an invitation corresponding to the embedded request is generated and/or sent. Alternatively, the specified user is added to the access control list of the respective document (and optionally to the access control list of an associated chat session, if any) in response to acceptance of the invitation by the specified user. However, in at least some of these embodiments, the specified user is added to the access control list of the respective document (and optionally to the access control list of an associated chat session, if any) only if the specified user is not already listed in the access control list with at least the level of access associated with the invitation.

In some embodiments, the invitation includes a link to the document being edited. (1016) Optionally, the link includes a command or position parameter specifying a portion of the document to be initially displayed or presented by the specified user's client when the link is selected or activated by the specified user. (1017) In some embodiments, when the link is selected by the specified user, a new document window opens and the document is displayed. In some embodiments, the link includes one or more commands that specify to the specified user's document editing application (e.g., document editing application 124 or web page with document editing application 232) which portion of the document to initially display when the document is opened. As a result, when a user selects the link, a new document window opens and the portion of the document containing the embedded request is displayed.

An example of a document editing invitation link is
<a href=www.docserver123.com/docs?di=DocID&loc=LocID>Invite Text</a>
Where www.docserver123.com/docs identifies a server system and document editing service, "DocID" identifies the document that the specified user is being invited to edit, view or co-write, "LocID" is a parameter or command that identifies a location within the document of the DocID document that is to be shown upon user activation of the link, and "Invite Text" is the text of the invitation. Optionally, the invitation text includes a portion of the document that the specified user is being invited to edit, view or co-write. In some implementations, the LocID identifies a comment within the document content, where the identified comment is the comment containing the embedded request to invite the specified user. In some other implementations the LocID identifies a position in the document that is at, adjacent or substantially adjacent (e.g., with a predefined edit distance) of the embedded request to invite the specified user.

In some embodiments, sending the invitation to the specified user includes, when the specified user is online, sending the invitation through an online channel corresponding to one of: an active window of an application corresponding to the chat session, an active window of an application corresponding to the document editing session, an inactive window of the document editing application, and an online application other than the application corresponding to the document editing session. (1018) In some embodiments, inline addressing module 114 determines how the specified user receives the invitation. As shown in FIG. 8A, if the user is using a chat application (e.g., chat application 122 or web page with chat application 230) that is connected to server system 106, the invited user receives a chat notification 800 or a chat window 802 is automatically opened on the user's application. In some embodiments, the chat application is integrated within another application such as a document editing application (e.g., chat+document editing application 126 or web page with chat+document editing application 234) or email application. If the specified user is not logged into the chat application, the specified user may receive the invitation though an active or inactive window of another application (e.g., browser 128) connected to server system 106. In a non-limiting example, as shown in FIGS. 8B and 8C, the specified user receives the invitation 810 through an active window 812 of an email application. In another example shown in FIG. 8D, the specified user receives the invitation 810 through an inactive web browser tab 811. In some embodiments, the inactive web browser tab 811 displays a notification of the invitation and when the specified user selects the inactive the window (e.g., inactive web browser tab 811 of FIG. 8D), the invitation is displayed somewhere in the now active window.

As explained above with reference to method 900, in some embodiments, the invitation is sent to the specified user in an email message or SMS message. In some implementations, the invitation is sent in an email message or SMS only if the specified user is not currently using any application connected (i.e., having a real-time or ongoing connection) to server system 106. In other words, how the specified user receives the invitation depends on whether the specified user is using one or more applications (e.g., 122, 124, 126, 128, 230, 232, and 234) connected to server system 106 and what application windows of those one or more applications are active or inactive on the specified user's client 102.

In some embodiments, the invitation includes document content. More specifically, in some embodiments a predefined amount of document content before and/or after the embedded request is included in the invitation. For example, a few paragraphs/sentences/words before and/or after the embedded request is included in the invitation. In a non-limiting example, in FIG. 7C, document text (e.g., "do these dates look correct to you?") may be included in the invitation. The document content, when included in an invitation to the specified user, helps the specified user/invited user understand why he or she is being invited to the document editing session.

In some embodiments, for a chat conversation associated with the document, chat content is received from one or more users authorized to access the document. (1020) In other words, the chat conversation is associated with the document editing session otherwise called a chat+document editing session. The chat content and/or document content is received from one or more client devices 102 connected to server system 106. In some embodiments, an embedded request to invite a specified user to the document editing session is detected within the document editing session. Optionally, the embedded request is added to the chat conversation and at least a portion of the chat conversation that includes the embedded request is sent to one or more of the users authorized to access the document. (1020) In some embodiments, a link to a portion of the document corresponding to the embedded request is also added to the chat conversation. (1022)

In some embodiments, in response to receiving acceptance of the invitation by the specified user, the server system sends at least at least a portion of the respective document to a client associated with the specified user. (1024)

In some embodiments, new document editing commands are received from the specified user and the document is edited in accordance with the new document editing commands. In other words, after accepting the invitation, the specified user becomes a participant of the document editing session and has sufficient access rights to edit the document.

Each of the methods described herein may be governed by instructions that are stored in a non-transitory computer readable storage medium and that are executed by one or more processors of one or more servers (e.g., server system 106). Each of the operations shown in FIGS. 9A, 9B, 9C, 10A and 10B may correspond to instructions stored in a computer memory or non-transitory computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing a multi-user session, comprising:
   at a server having one or more processors and memory storing one or more programs to be executed by the one or more processors so as to perform the method:
   detecting, from a first user, an embedded request to have another user access the multi-user session, wherein the embedded request includes a first portion that identifies the request as an embedded request and a second portion; and
   in response to detecting the embedded request:
   querying an address book uniquely associated with the first user for a match to the second portion of the embedded request, wherein, when one or more contact suggestions are found in the address book that match the second portion of the embedded request, sending the one or more contact suggestions to a client associated with the first user for confirmation and upon confirmation:
   (i) making the embedded request visible to all participants in the multi-user session,
   (ii) sending a communication to the one or more contact suggestions regarding participating in the multi-user session, and
   (iii) adding the one or more contact suggestions to an access control list for the multi-user session to enable the one or more contact suggestions to participate in the multi-user session.

2. The method of claim 1, wherein
   the multi-user session is a document editing session in which a document is edited,
   each user in the multi-user access control list has a privilege to edit the document, and
   the document is selected from the group consisting of a word processing document, a spreadsheet document, a presentation document, a drawing, and a webpage.

3. The method of claim 1, wherein
   the second portion follows the first portion,
   the first portion includes a predefined symbol, and
   the second portion comprises an identifier of the specified user.

4. The method of claim 1, wherein the embedded request is in a communication from the first user that includes a third portion, wherein the third portion is text to be included in the multi-user session.

5. The method of claim 1, wherein the communication to the one or more contact suggestions includes a link to a document being edited in the multi-user session, the link including a command or position parameter specifying a portion of the document to be initially displayed or presented by the one or more contact suggestion's client when the link is selected or activated by the one or more contact suggestions.

6. The method of claim 1, wherein sending the communication to a contact suggestion in the one or more contact suggestions includes, when the contact suggestion is online, sending the communication to the contact suggestion through an online channel corresponding to one of: an active window of an application corresponding to the multi-user session and an inactive window of the application corresponding to the multi-user session.

7. The method of claim 1, wherein the communication to a contact suggestion in the one or more contact suggestions includes an invitation to join the multi-user session, and, in response to receiving from the contact suggestion acceptance of the invitation, sending at least a portion of the multi-user session to a client associated with the contact suggestion.

8. The method of claim 1, wherein the multi-user session is a document editing session in which a document is edited, the method further including:
   receiving chat content from one or more of the users authorized to access the document, for a chat conversation associated with the document;
   adding the embedded request to the chat conversation; and
   sending at least a portion of the chat conversation that includes the embedded request to one or more of the users authorized to access the document.

9. The method of claim 8, the method further including adding to the chat conversation a link to a portion of the document corresponding to the embedded request.

10. The method of claim 1, wherein the multi-user session is a text chatting session.

11. The method of claim 1, wherein the multi-user session is a document editing session.

12. The method of claim 1, wherein the address book includes a plurality of fields for each contact, including at least a first name and a last name and wherein the querying matches the second portion of the embedded request against each of the plurality of fields of each contact in the address book to find the one or more contact suggestions.

13. A non-transitory computer readable storage medium storing one or more programs configured for execution by one or more processors of a server system, the one or more programs comprising:

detecting, from a first user, an embedded request to have another user access a multi-user session, wherein the embedded request includes a first portion that identifies the request as an embedded request and a second portion; and in response to detecting the embedded request:

querying an address book uniquely associated with the first user for a match to the second portion of the embedded request, wherein, when one or more contact suggestions are found in the address book that match the second portion of the embedded request, sending the one or more contact suggestions to a client associated with the first user for confirmation and upon confirmation:

(i) making the embedded request visible to all participants in the multi-user session,
      (ii) sending a communication to the one or more contact suggestions regarding participating in the multi-user session, and
      (iii) adding the one or more contact suggestions to an access control list for the multi-user session to enable the specified user to participate in the multi-user session.

14. The computer readable storage medium of claim 13, wherein the multi-user session is a document editing session in which a document is edited,
  each user in the multi-user access control list has a privilege to edit the document, and
  the document is selected from the group consisting of a word processing document, a spreadsheet document, a presentation document, a drawing, and a webpage.

15. The computer readable storage medium of claim 13, wherein the second portion follows the first portion, and
  the first portion includes a predefined symbol, and the second portion comprises an identifier of the specified user.

16. The computer readable storage medium of claim 13, wherein the multi-user session is a text chatting session.

17. The computer readable storage medium of claim 13, wherein the multi-user session is a document editing session.

18. A server system, comprising:

one or more processors; and
  memory storing one or more programs for execution by the one or more processors, the one or more programs including:

detecting, from a first user, an embedded request to have another user access a multi-user session, wherein the embedded request includes a first portion that identifies the request as an embedded request and a second portion; and in response to detecting the embedded request:

querying an address book uniquely associated with the first user for a match to the second portion of the embedded request, wherein when one or more contact suggestions are found in the address book that match the second portion of the embedded request, sending the one or more contact suggestions to a client associated with the first user for confirmation and upon confirmation:

(i) making the embedded request visible to all participants in the multi-user session,
        (ii) sending a communication to the one or more contact suggestions regarding participating in the multi-user session, and
        (iii) adding the one or more contact suggestions to an access control list for the multi-user session to enable the specified user to participate in the multi-user session.

19. The server system of claim 18, wherein the multi-user session is a text chatting session or a document editing session.

* * * * *